US006912498B2

(12) United States Patent
Stevens et al.

(10) Patent No.: US 6,912,498 B2
(45) Date of Patent: Jun. 28, 2005

(54) ERROR CORRECTION IN SPEECH RECOGNITION BY CORRECTING TEXT AROUND SELECTED AREA

(75) Inventors: Daniell Stevens, Somerville, MA (US); Robert Roth, Newtonville, MA (US); Joel M. Gould, Winchester, MA (US); Michael J. Newman, Somerville, MA (US); Dean Sturtevant, Waltham, MA (US); Charles E. Ingold, Bedford, MA (US); David Abrahams, Cambridge, MA (US); Allan Gold, Acton, MA (US)

(73) Assignee: ScanSoft, Inc., Peabody, MA (US)

( * ) Notice: Subject to any disclaimer, the term of this patent is extended or adjusted under 35 U.S.C. 154(b) by 349 days.

(21) Appl. No.: 09/845,769

(22) Filed: May 2, 2001

(65) Prior Publication Data

US 2002/0138265 A1 Sep. 26, 2002

(Under 37 CFR 1.47)

Related U.S. Application Data

(60) Provisional application No. 60/201,257, filed on May 2, 2000.

(51) Int. Cl.[7] .............................................. G10L 15/04
(52) U.S. Cl. ...................... 704/235; 704/251; 704/256; 704/244
(58) Field of Search ................................ 704/235, 256, 704/254, 251, 244, 200

(56) References Cited

U.S. PATENT DOCUMENTS

| | | | |
|---|---|---|---|
| 5,027,406 A | * | 6/1991 | Roberts et al. ............. 704/244 |
| 5,594,809 A | | 1/1997 | Kopec et al. |
| 5,625,748 A | | 4/1997 | McDonough et al. |
| 5,748,840 A | * | 5/1998 | La Rue ...................... 704/254 |
| 5,754,978 A | | 5/1998 | Perez-Mendez et al. |
| 5,794,189 A | | 8/1998 | Gould |
| 5,799,279 A | | 8/1998 | Gould et al. |
| 5,864,805 A | * | 1/1999 | Chen et al. ................. 704/235 |
| 5,963,903 A | * | 10/1999 | Hon et al. ................... 704/254 |
| 6,064,959 A | | 5/2000 | Young et al. |
| 6,073,099 A | * | 6/2000 | Sabourin et al. ............ 704/256 |
| 6,212,498 B1 | | 4/2001 | Sherwood et al. |
| 6,374,221 B1 | * | 4/2002 | Haimi-Cohen .............. 704/256 |
| 6,535,849 B1 | * | 3/2003 | Pakhomov et al. ......... 704/235 |
| 2002/0138265 A1 | * | 9/2002 | Stevens et al. ............. 704/251 |

OTHER PUBLICATIONS

U.S. Appl. No. 60/201,257, filed May 2000, Roth et al.*
IBM ("Technical Disclosure Bulletin NB900315, Automatic Correction of Viterbi Misalignments", Mar. 1990).*
Iyer et al ("Analyzing And Predicting Language Model Improvements", 1997 IEEE Workshop on Automatic Speech Recognition and Understanding, Dec. 1997).*

(Continued)

Primary Examiner—Vijay B. Chawan
(74) Attorney, Agent, or Firm—Fish & Richardson P.C.

(57) ABSTRACT

Correcting incorrect text associated with recognition errors in computer-implemented speech recognition includes receiving a selection of a word from a recognized utterance. The selection indicates a bound of a portion of the recognized utterance to be corrected. A first recognition correction is produced based on a comparison between a first alternative transcript and the recognized utterance. A second recognition correction is produced based on a comparison between a second alternative transcript and the recognized utterance. The duration of the first recognition correction differs from the duration of the second recognition correction. A portion of the recognition result that is replaced with one of the first recognition correction and the second recognition correction. includes at one bound a word indicated by the selection and extends for the duration of the one of the first recognition correction and the second recognition correction with which the portion is replaced.

32 Claims, 24 Drawing Sheets

OTHER PUBLICATIONS

Niyogi et al ("Incorporating Voice Onset Time To Improve Letter Recognition Accuracies", Proceedings of the 1998 IEEE International Conference on Acoustics, Speech, and Signal Processing, May 1998).*

Elizabeth D. Liddy and Sung H. Myaeng, A System Update for TREC-2, Sep. 3, 1998, pp. 1–11; School of Information Studies, Syracuse University, Syracuse, New York.

John W. Lehman and Clifford A. Reid, et al., Knowledge-Based Searching with TOPIC, Sep. 4, 1998, pp. 1–13, Verity, Inc., Mountain View, CA.

Richard Stern, George Doddington, Dave Pallet, and Charles Wayne, Specification for the ARPA Nov. 1996 HUB 4 Evaluation, Nov. 1, 1996, pp. 1–5 National Institutes of Standards and Technology.

* cited by examiner select "wreck"

let's |wreck| a nice beach —1700

1710

1705

| reck |
| recked |
| wreaked |
| rack |
| racked |
| whack |
| wick |
| wicked |

FIG. 11B

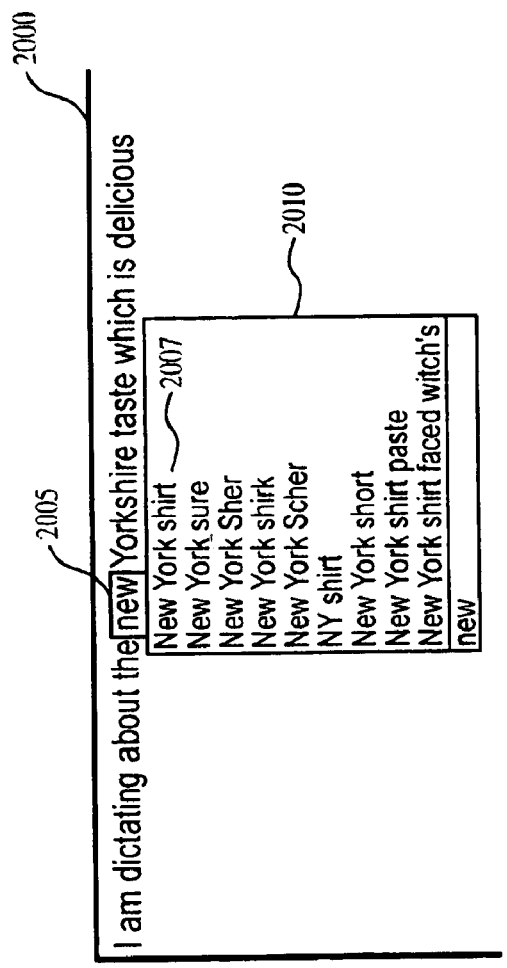

FIG. 21

| | <b> | w | u | l | i | z | l | L | f | 6 | n | S | g | r | ~ | s | k | e |
|---|---|---|---|---|---|---|---|---|---|---|---|---|---|---|---|---|---|---|
| <b> | 38 | 21 | 15 | 7 | 15 | 15 | 15 | 35 | 18 | 14 | 11 | 30 | 20 | 16 | 20 | 11 | 13 | 26 |
| w | 14 | 0 | 38 | 38 | 38 | 38 | 17 | 38 | 31 | 38 | 38 | 38 | 38 | 21 | 38 | 38 | 38 | 38 |
| u | 16 | 38 | 0 | 38 | 23 | 33 | 30 | 24 | 38 | 16 | 38 | 38 | 29 | 38 | 26 | 38 | 38 | 17 |
| l | 10 | 38 | 38 | 0 | 38 | 38 | 38 | 38 | 38 | 38 | 38 | 38 | 38 | 38 | 38 | 38 | 38 | 38 |
| i | 19 | 38 | 18 | 38 | 0 | 38 | 38 | 33 | 38 | 11 | 38 | 38 | 25 | 38 | 22 | 27 | 33 | 15 |
| z | 17 | 38 | 38 | 38 | 38 | 0 | 38 | 38 | 26 | 38 | 38 | 29 | 38 | 38 | 38 | 10 | 38 | 38 |
| l | 16 | 22 | 38 | 38 | 38 | 38 | 31 | 0 | 38 | 34 | 34 | 26 | 38 | 38 | 28 | 38 | 38 | 38 |
| L | 29 | 38 | 16 | 38 | 32 | 38 | 32 | 0 | 32 | 29 | 38 | 38 | 38 | 38 | 38 | 38 | 32 | 18 |
| f | 18 | 33 | 38 | 22 | 38 | 30 | 38 | 38 | 0 | 38 | 38 | 38 | 38 | 38 | 38 | 25 | 38 | 38 |
| 6 | 10 | 38 | 17 | 38 | 10 | 38 | 38 | 32 | 38 | 1 | 38 | 38 | 26 | 38 | 25 | 38 | 38 | 21 |
| n | 15 | 38 | 38 | 22 | 38 | 38 | 34 | 38 | 38 | 38 | 0 | 38 | 38 | 31 | 21 | 38 | 38 | 38 |
| S | 38 | 38 | 38 | 38 | 29 | 38 | 38 | 38 | 38 | 38 | 38 | 0 | 38 | 38 | 38 | 23 | 38 | 38 |
| g | 10 | 38 | 15 | 38 | 15 | 38 | 38 | 38 | 38 | 17 | 38 | 38 | 1 | 38 | 38 | 23 | 38 | 23 |
| r | 16 | 26 | 34 | 38 | 37 | 38 | 34 | 31 | 34 | 33 | 29 | 37 | 33 | 0 | 34 | 38 | 38 | 38 |
| ~ | 16 | 38 | 38 | 38 | 27 | 38 | 38 | 30 | 38 | 14 | 12 | 38 | 33 | 33 | 0 | 38 | 38 | 17 |
| s | 18 | 38 | 38 | 38 | 38 | 15 | 38 | 38 | 27 | 38 | 38 | 24 | 38 | 38 | 38 | 0 | 38 | 38 |
| k | 19 | 38 | 38 | 19 | 38 | 38 | 38 | 38 | 32 | 38 | 38 | 38 | 38 | 38 | 38 | 38 | 0 | 38 |
| e | 19 | 38 | 17 | 38 | 18 | 38 | 38 | 25 | 38 | 21 | 38 | 38 | 30 | 38 | 22 | 38 | 38 | 0 |

2700

ERROR CORRECTION IN SPEECH RECOGNITION BY CORRECTING TEXT AROUND SELECTED AREA

CROSS REFERENCE TO RELATED APPLICATION

This application claims benefit to U.S. Application No. 60/201,257, filed May 2, 2000, which is incorporated herein by reference.

TECHNICAL FIELD

This invention relates to error correction in computer-implemented speech recognition.

BACKGROUND

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A continuous speech recognition system can recognize spoken words or phrases regardless of whether the user pauses between them. By contrast, a discrete speech recognition system recognizes discrete words or phrases and requires the user to pause briefly after each discrete word or phrase. Continuous speech recognition systems typically have a higher incidence of recognition errors in comparison to discrete recognition systems due to complexities of recognizing continuous speech.

In general, the processor of a continuous speech recognition system analyzes "utterances" of speech. An utterance includes a variable number of frames and may correspond to a period of speech followed by a pause of at least a predetermined duration.

The processor determines what the user said by finding acoustic models that best match the digital frames of an utterance, and identifying text that corresponds to those acoustic models. An acoustic model may correspond to a word, phrase or command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise.

The words or phrases corresponding to the best matching acoustic models are referred to as recognition candidates. The processor may produce a single recognition candidate (that is, a single sequence of words or phrases) for an utterance, or may produce a list of recognition candidates.

Correction mechanisms for some discrete speech recognition systems displayed a list of choices for each recognized word and permitted a user to correct a misrecognition by selecting a word from the list or typing the correct word. For example, DRAGONDICTATE™ for MICROSOFT WINDOWS™, by Dragon Systems, Inc. of Newton, Mass., displayed a list of numbered recognition candidates ("a choice list") for each word spoken by the user, and inserted the best-scoring recognition candidate into the text being dictated by the user. If the best-scoring recognition candidate was incorrect, the user could select a recognition candidate from the choice list by saying "choose-N", where "N" was the number associated with the correct candidate. If the correct word was not on the choice list, the user could refine the list, either by typing in the first few letters of the correct word, or by speaking words (for example, "alpha", "bravo") associated with the first few letters. The user also could discard the incorrect recognition result by saying "scratch that".

Dictating a new word implied acceptance of the previous recognition. If the user noticed a recognition error after dictating additional words, the user could say "Oops", which would bring up a numbered list of previously-recognized words. The user could then choose a previously-recognized word by saying "word-N", where "N" was a number associated with the word. The system would respond by displaying a choice list associated with the selected word and permitting the user to correct the word as described above.

SUMMARY

New techniques and systems improve error correction in speech recognition. These techniques and systems may be used in a standard desktop environment, in a mobile environment, or in any other type of environment that can receive and/or present recognized speech. Moreover, the techniques and systems also may leverage the power of continuous speech recognition systems, such as DRAGON NATURALLY SPEAKING™ available from Dragon Systems, Inc. of Newton, Mass., the capabilities of digital recorders and hand-held electronic devices, and the advantages of using a contact manager or similar system for personal information management.

In one general aspect, a method of correcting incorrect text associated with recognition errors in computer-implemented speech recognition includes performing speech recognition on an utterance to produce a recognition result for the utterance and receiving a selection of a word from the recognized utterance. The selection indicates a bound of a portion of the recognized utterance to be corrected. A first recognition correction is produced based on a comparison between a first alternative transcript and the recognized utterance to be corrected. A second recognition correction is produced based on a comparison between a second alternative transcript and the recognized utterance to be corrected. A portion of the recognition result is replaced with one of the first recognition correction and the second recognition correction. A duration of the first recognition correction differs from a duration of the second recognition correction. Furthermore, the portion of the recognition result replaced includes at one bound the word indicated by the selection and extends for the duration of the one of the first recognition correction and the second recognition correction with which the portion is replaced.

Implementations may include one or more of the following features. For example, the selection may indicate a beginning bound or a finishing bound of a recognized utterance to be corrected.

The comparison between an alternative transcript and the recognized utterance may include selecting from the alternative transcript a test word that is not identical to the selected word. The test word begins at a time that is nearest a time at which the selected word begins. The comparison between the alternative transcript and the recognized utterance may further include searching in time through the recognized utterance and relative to the selected word and through the alternative transcript and relative to the test word until a word common to the recognized utterance and the alternative transcript is found. The common word may begin at a time in the recognized utterance that is approximately near a time at which the common word begins in the alternative transcript.

Production of a recognition correction may include selecting a word string from the alternative transcript. The word string is bound by the test word from the alternative transcript and by a word from the alternative transcript that is adjacent to the common word and between the test word and the common word. The method may include receiving a selection of one of the first recognition correction and the second recognition correction.

Searching in time through the recognized utterance and through the alternative transcript may include designating a word adjacent to the test word as an alternative transcript word, designating a word adjacent to the selected word as an original transcript word, and comparing the original transcript word to the alternative transcript word.

The original transcript word and the alternative transcript word may be designated as the common word if the original transcript word is identical to the alternative transcript word and if a time at which the original transcript word begins is near a time at which the alternative transcript word begins.

A word in the alternative transcript that is adjacent to the alternative transcript word may be designated as the alternative transcript word whether or not the original transcript word is identical to the alternative transcript word if the original transcript word begins at a time that is later than a time at which the alternative transcript word begins. A word in the original transcript that is adjacent to the original transcript word may be designated as the original transcript word whether or not the original transcript word is identical to the alternative transcript word if the original transcript word begins at a time that is earlier than a time at which the alternative transcript word begins. A word in the original transcript that is adjacent to the original transcript word may be designated as the original transcript word and a word in the alternative transcript that is adjacent to the alternative transcript word may be designated as the alternative transcript word if the original transcript word is not identical to the alternative transcript word and if a time at which the original transcript word begins is near a time at which the alternative transcript word begins.

A floating-choice-list system provides an advantage over prior choice-list systems when used in hand-held or portable devices, which often require use of a stylus as an input device. In such a stylus system, it would be difficult for a user to select two or more words to be corrected using prior choice-list systems. In particular, users would be required to perform the difficult task of carefully selecting a range of words to be corrected using a stylus before selecting an alternative transcript. The floating-choice-list system simplifies the required stylus events needed to perform a multiword correction for speech recognition on a hand-held device. Using the floating-choice-list system, the user only needs to contact the stylus somewhere in the word that begins the error-filled region in order to obtain a list of alternative transcripts.

In another general aspect, a method of correcting incorrect text associated with recognition errors in computer-implemented speech recognition includes receiving a text document formed by recognizing speech utterances using a vocabulary. The method also includes receiving a general confusability matrix and receiving corrected text. The general confusability matrix has one or more values, each value indicating a likelihood of confusion between a first phoneme and a second phoneme. The corrected text corresponds to misrecognized text from the text document. If the corrected text is not in the vocabulary, the method includes generating a sequence of phonemes for the corrected text. The generated sequence of phonemes is aligned with phonemes of the misrecognized text and one or more values of the general confusability matrix are adjusted based on the alignment to form a specific confusability matrix. The method further includes searching the text document for additional instances of the corrected text using the specific confusability matrix.

Implementations may include one or more of the following features. The method may further include outputting the text document. A list of recognition candidates may be associated with each recognized speech utterance. The step of generating the sequence of phonemes for the corrected text may include using a phonetic alphabet.

The method may also include generating the general confusability matrix using empirical data. In that case, the empirical data may include information relating to a rate of confusion of phonemes for a preselected population, information relating to frequency characteristics of different phonemes, or information acquired during an adaptive training of a user.

The step of searching the text document for the corrected text may include searching the text document for the sequence of phonemes for the corrected text. The step of searching the text document for the corrected text may include searching the text document for a sequence of phonemes that is likely to be confused with the sequence of phonemes for the corrected text.

The step of searching the text document for the corrected text may include scoring a portion of the text document and comparing the score of the portion to an empirically determined threshold value to determine whether the portion of the text document includes a word that is not in the vocabulary. In this case, the method may further include outputting a result if it is determined that the portion of the text document includes a word that is not in the vocabulary. Moreover, the step of outputting the result may include highlighting the portion of the text document or re-recognizing the portion of the text document.

In another general aspect a computer-implemented method for speech recognition includes receiving dictated text, generating recognized speech based on the received dictated text, receiving an edited text of the recognized speech, and determining an acoustic model for the edited text. The step of generating includes determining acoustic models for the dictated text that best match acoustic data for the dictated text. The edited text indicates a replacement for a portion of the dictated text. The method also includes determining whether to adapt acoustic models for the edited text based on the acoustic model for the edited text and the acoustic model for the dictated text portion.

Implementations may include one or more of the following features. The method may also include calculating an acoustic model score based on a comparison between the acoustic model for the edited text and the acoustic data for the dictated text portion. In this case, the step of determining whether to adapt acoustic models for the edited text may be based on the calculated acoustic model score. The step of determining whether to adapt acoustic models may include calculating an original acoustic model score based on a comparison between the acoustic model for the dictated text portion and the acoustic data for the dictated text portion. The step of determining whether to adapt acoustic models may include calculating a difference between the acoustic model score and the original acoustic model score. The step of determining whether to adapt acoustic models may include determining whether the difference is less than a predetermined value. The step of determining whether to adapt acoustic models may include adapting acoustic models for the edited text if the difference is less than a predetermined value. The step of determining whether to adapt acoustic models for the edited text may include bypassing adapting acoustic models for the edited text if the difference is greater than or equal to a predetermined value.

The step of receiving the edited text of the recognized speech may occur during a recognition session in which the recognized speech is generated or after a recognition session in which the recognized speech is generated. The step of receiving the edited text of the recognized speech may include receiving a selection of the portion of the dictated text.

The step of determining an acoustic model for the edited text may include searching for the edited text in a vocabulary or a backup dictionary used to generate the recognized speech. The step of determining an acoustic model for the edited text may include selecting an acoustic model that best matches the edited text.

In another general aspect, a computer-implemented method of speech recognition includes performing speech recognition on an utterance to produce a recognition result for the utterance, receiving a selection of the recognition result, receiving a correction of the recognition result, and performing speech recognition on the correction using a constraint grammar that permits spelling and pronunciation in parallel. The method includes identifying whether the correction comprises a spelling or a pronunciation using the constraint grammar.

Implementations may include one or more of the following features. The method may include generating a replacement result for the recognition result based on the correction.

The constraint grammar may include a spelling portion and a dictation vocabulary portion. In that case, the spelling portion may indicate that the first utterance from the user is a letter in an alphabet. The vocabulary portion may indicate that the first utterance from the user is a word from the dictation vocabulary. The spelling portion may indicate a frequency with which letters occur in a language model. The dictation vocabulary portion may indicate a frequency with which words occur in a language model. The method may also include introducing a biasing value between the spelling and the dictation vocabulary portions of the constraint grammar.

Systems and computer programs for implementing the described techniques and systems are also contemplated.

The details of one or more implementations are set forth in the accompanying drawings and the description below. Other features, objects, and advantages will be apparent from the description, the drawings, and the claims.

DESCRIPTION OF THE DRAWINGS

FIGS. 11A–11C are screen displays of a user interface of the speech recognition system of FIGS. 1 and 5.

FIGS. 14, 17, 18, and 19A–19C are screen displays of a user interface of the speech recognition system of FIGS. 1 and 5.

FIG. 15 is a table showing synchronization between first and alternative transcripts used to determine a choice list using the procedures of FIGS. 12 and 16.

FIG. 21 is a table showing a phoneme confusability matrix.

Like reference symbols in the various drawings indicate like elements.

DESCRIPTION

Figure 1:
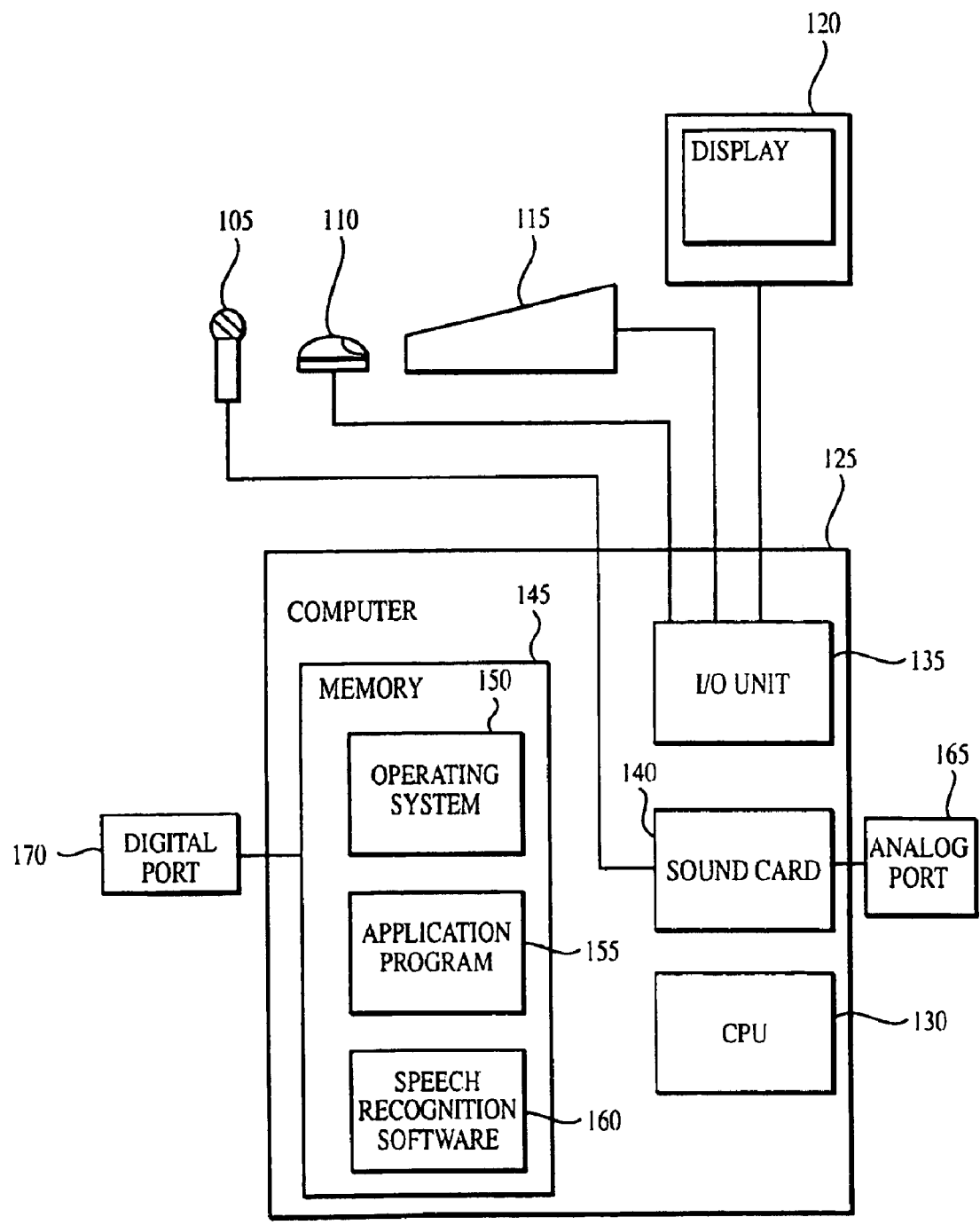
FIG. 1 is a block diagram of a speech recognition system.

Referring to FIG. 1, one implementation of a speech recognition system 100 includes input/output (I/O) devices (for example, microphone 105, mouse 110, keyboard 115, and display 120) and a general-purpose computer 125 having a processor 130, an I/O unit 135 and a sound card 140. A memory 145 stores data and programs such as an operating system 150, an application program 155 (for example, a word processing program), and speech recognition software 160.

The microphone 105 receives the user's speech and conveys the speech, in the form of an analog signal, to the sound card 140, which in turn passes the signal through an analog-to-digital (A/D) converter to transform the analog signal into a set of digital samples. Under control of the operating system 150 and the speech recognition software 160, the processor 130 identifies utterances in the user's continuous speech. Utterances are separated from one another by a pause having a sufficiently large, predetermined duration (for example, 160–250 milliseconds). Each utterance may include one or more words of the user's speech.

The system may also include an analog recorder port 165 and/or a digital recorder port 170. The analog recorder port 165 is connected to the sound card 140 and is used to transmit speech recorded using a hand-held recorder to the sound card. The analog recorder port may be implemented as a microphone positioned to be next to the speaker of the hand-held recorder when the recorder is inserted into the port 165, and may be implemented using the microphone 105. Alternatively, the analog recorder port 165 may be implemented as a tape player that receives a tape recorded using a hand-held recorder and transmits information recorded on the tape to the sound card 140.

The digital recorder port 170 may be implemented to transfer a digital file generated using a hand-held digital recorder. This file may be transferred directly into memory 145. The digital recorder port 170 may be implemented as a storage device (for example, a floppy drive or CD-ROM drive) of the computer 125.

Figure 2:
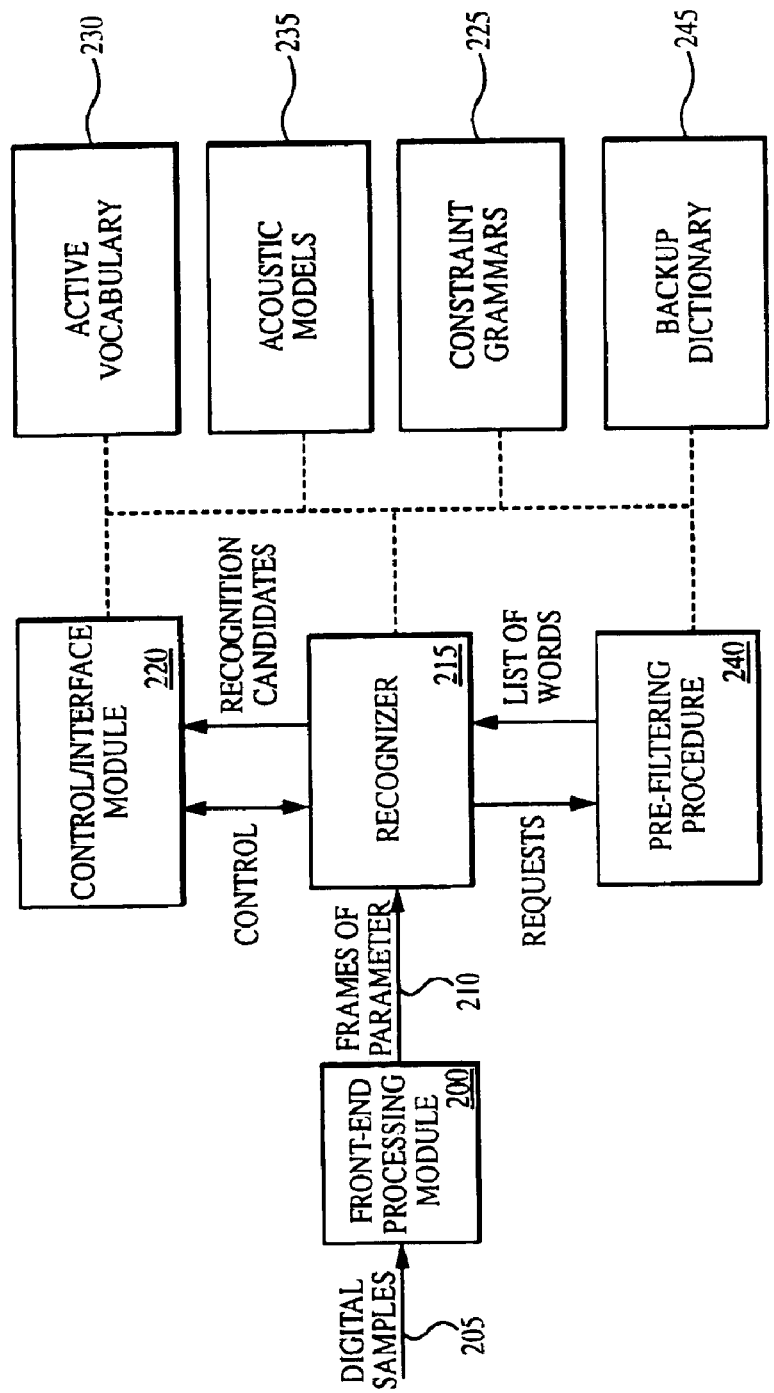
FIG. 2 is a block diagram of speech recognition software of the system of FIG. 1.

FIG. 2 illustrates typical components of the speech recognition software 160. For ease of discussion, the following description indicates that the components carry out operations to achieve specified results. However, it should be understood that each component actually causes the processor 130 to operate in the specified manner.

Initially, a front end processing module 200 converts the digital samples 205 from the sound card 140 (or from the digital recorder port 170) into frames of parameters 210 that represent the frequency content of an utterance. Each frame includes 24 parameters and represents a short portion (for example, 10 milliseconds) of the utterance.

A recognizer 215 receives and processes the frames of an utterance to identify text corresponding to the utterance. The recognizer entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer provides the best-scoring hypotheses to the control/interface module 220 as a list of recognition candidates, where each recognition candidate corresponds to a hypothesis and has an associated score. Some recognition candidates may correspond to text while other recognition candidates correspond to commands. Commands may include words, phrases, or sentences.

The recognizer 215 processes the frames 210 of an utterance in view of one or more constraint grammars 225. A constraint grammar, also referred to as a template or restriction rule, may be a limitation on the words that may correspond to an utterance, a limitation on the order or grammatical form of the words, or both. For example, a constraint grammar for menu-manipulation commands may include only entries from the menu (for example, "file", "edit") or command words for navigating through the menu (for example, "up", "down", "top", "bottom"). Different constraint grammars may be active at different times. For example, a constraint grammar may be associated with a particular application program 155 and may be activated when the user opens the application program and deactivated when the user closes the application program. The recognizer 215 discards any hypothesis that does not comply with an active constraint grammar. In addition, the recognizer 215 may adjust the score of a hypothesis associated with a particular constraint grammar based on characteristics of the constraint grammar.

Figure 3A:
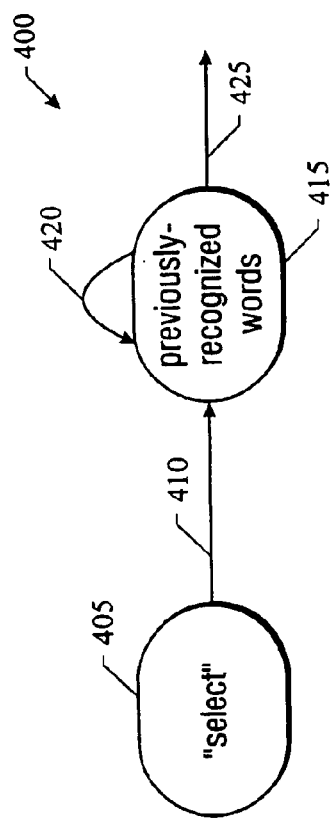
FIGS. 3A and 3B are state diagrams of a constraint grammar.
Figure 3B:
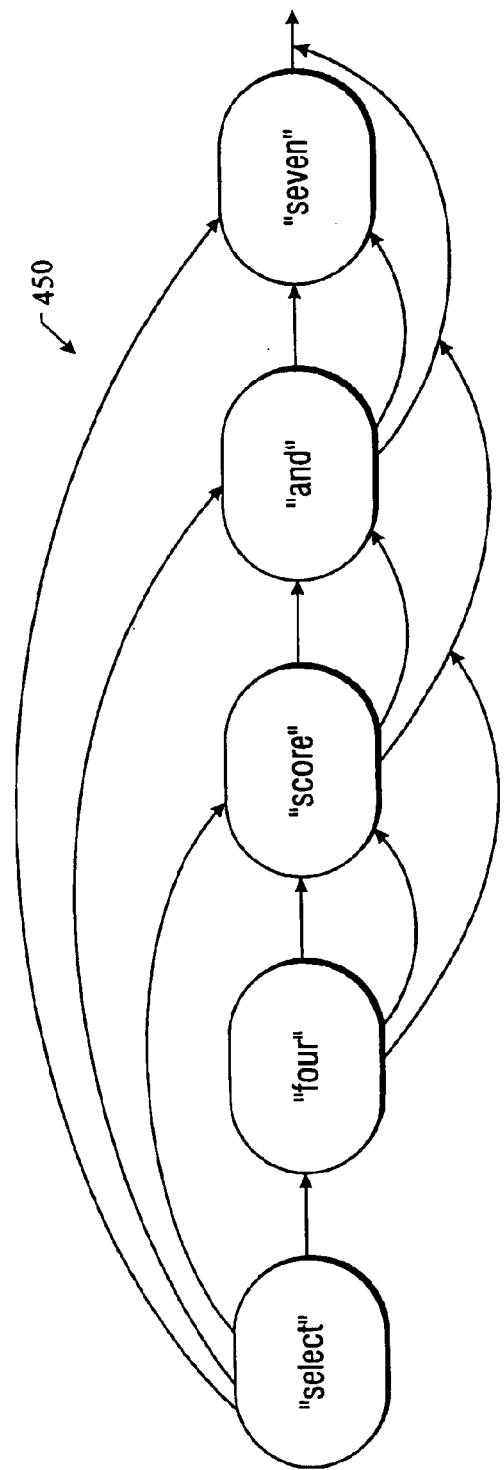

FIG. 3A illustrates an example of a constraint grammar for a "select" command used to select previously recognized text. As shown, a constraint grammar may be illustrated as a state diagram 400. The "select" command includes the word "select" followed by one or more previously-recognized words, with the words being in the order in which they were previously recognized. The first state 405 of the constraint grammar indicates that the first word of the select command must be "select". After the word "select", the constraint grammar permits a transition along a path 410 to a second state 415 that requires the next word in the command to be a previously-recognized word. A path 420, which returns to the second state 415, indicates that the command may include additional previously-recognized words. A path 425, which exits the second state 415 and completes the command, indicates that the command may include only previously-recognized words. FIG. 3B illustrates the state diagram 450 of the constraint grammar for the select command when a previously-recognized utterance is "four score and seven". This state diagram could be expanded to include words from additional utterances. The "select" command and techniques for generating its constraint grammar are described further in U.S. Pat. No. 5,794,189, entitled "CONTINUOUS SPEECH RECOGNITION" and issued Aug. 11, 1998, which is incorporated herein by reference.

The constraint grammar also may be expressed in Backus-Naur Form (BNF) or Extended BNF (EBNF). In EBNF, the grammar for the "Select" command is:

<recognition result>::=Select <words>, where
<words>::=[PRW1[PRW2[PRW3 . . . PRWn]]]|
[PRW2[PRW3 . . . PRWn]] . . . [PRWn],
"PRWi" is the previously-recognized word i,
[] means optional,
<> means a rule,
| means an OR function, and
::=means "is defined as" or "is".

As illustrated in FIGS. 3A and 3B, this notation indicates that "select" may be followed by any ordered sequence of previously-recognized words. This grammar does not permit optional or alternate words. In some instances, the grammar may be modified to permit optional words (for example, an optional "and" to permit "four score and seven" or "four score seven") or alternate words or phrases (for example, "four score and seven" or "eighty seven"). Constraint grammars are discussed further in U.S. Pat. No. 5,799,279, entitled "CONTINUOUS SPEECH RECOGNITION OF TEXT AND COMMANDS" and issued Aug. 25, 1998, which is incorporated herein by reference.

Another constraint grammar 225 that may be used by the speech recognition software 160 is a large vocabulary dictation grammar. The large vocabulary dictation grammar identifies words included in the active vocabulary 230, which is the vocabulary of words available to the software during recognition. The large vocabulary dictation grammar also indicates the frequency with which words occur. A language model associated with the large vocabulary dictation grammar may be a unigram model that indicates the frequency with which a word occurs independently of context, or a bigram model that indicates the frequency with which a word occurs in the context of a preceding word. For example, a bigram model may indicate that a noun or adjective is more likely to follow the word "the" than is a verb or preposition.

Other constraint grammars 225 include an in-line dictation macros grammar for dictation commands, such as "CAP" or "Capitalize" to capitalize a word and "New-Paragraph" to start a new paragraph; the select X Y Z grammar discussed above and used in selecting text; an error correction commands grammar; a dictation editing grammar; an application command and control grammar that may be used to control a particular application program 155; a global command and control grammar that may be used to control the operating system 150 and the speech recognition software 160; a menu and dialog tracking grammar that may be used to manipulate menus; and a keyboard control grammar that permits the use of speech in place of input devices, such as the keyboard 115 or the mouse 110.

The active vocabulary 230 uses a pronunciation model in which each word is represented by a series of phonemes that comprise the phonetic spelling of the word. Each phoneme may be represented as a triphone that includes multiple nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files contain all of the words, pronunciations, and language model information for the user. Dictation and command grammars may be split between vocabulary files to optimize language model information and memory use, and to keep each single vocabulary file under 64,000 words.

Separate acoustic models 235 are provided for each user of the system. Initially speaker-independent acoustic models of male or female speech are adapted to a particular user's speech using an enrollment program. The acoustic models may be further adapted as the system is used. The acoustic models are maintained in a file separate from the active vocabulary 230.

The acoustic models 235 represent phonemes. In the case of triphones, the acoustic models 235 represent each triphone node as a mixture of Gaussian probability density functions ("PDFs"). For example, node "i" of a triphone "abc" may be represented as ab$^i$c:

$$ab^ic = \sum_k w_k N(\mu_k, c_k),$$

where each $w_k$ is a mixture weight, $$\sum_k w_k = 1,$$

$\mu_k$ is a mean vector for the probability density function ("PDF") $N_k$, and $c_k$ is the covariance matrix for the PDF $N_k$. Like the frames in the sequence of frames, the vectors $\mu_k$ each include twenty four parameters. The matrices $c_k$ are twenty four by twenty four matrices. Each triphone node may be represented as a mixture of up to, for example, sixteen different PDFs.

A particular PDF may be used in the representation of multiple triphone nodes. Accordingly, the acoustic models 235 represent each triphone node as a collection of mixture weights $w_k$ associated with up to sixteen different PDFs $N_k$, and separately represent each PDF $N_k$ using a mean vector $\mu_k$ and a covariance matrix $c_k$. Use of a particular PDF to represent multiple triphone nodes permits the models to include a smaller number of PDFs than would be required if each triphone node included entirely separate PDFs. Since the English language may be roughly represented using 50 different phonemes, there may be up to 125,000 ($50^3$) different triphones, which would result in a huge number of PDFs if each triphone node were represented by a separate set of PDFs. Representing multiple nodes with common PDFs also may remedy or reduce a data sparsity problem that results because some triphones (for example, "tzp" in the English language) rarely occur. These rare triphones may be represented by having closely-related triphones share the same set of PDFs.

A large vocabulary dictation grammar may include multiple dictation topics (for example, "medical" or "legal"), each having its own vocabulary file and its own language model. A dictation topic includes a set of words, which represents the active vocabulary 230, as well as an associated language model.

A complete dictation vocabulary may consist of the active vocabulary 230 plus a backup vocabulary 245. The backup vocabulary may include files that contain user-specific backup vocabulary words and system-wide backup vocabulary words.

User-specific backup vocabulary words include words that a user has created while using the speech recognition software. These words are stored in vocabulary files for the user and for the dictation topic, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary.

In addition to the user-specific backup vocabulary noted above, there is a system-wide backup vocabulary. The system-wide backup vocabulary contains all the words known to the system, including words that may currently be in an active vocabulary.

The recognizer 215 may operate in parallel with a pre-filtering procedure 240. Upon initiating processing of an utterance, the recognizer 215 requests from the pre-filtering procedure 240 a list of words that may have been spoken as the first word of the utterance (that is, words that may correspond to the first and subsequent frames of the utterance). The pre-filtering procedure 240 performs a coarse comparison of the sequence of frames with the active vocabulary 230 to identify a subset of the vocabulary for which a more extensive comparison using the recognizer is justified.

After the pre-filtering procedure responds with the requested list of words, the recognizer initiates a hypothesis for each word from the list and compares acoustic models for the word to the frames of parameters representing the utterance. The recognizer uses the results of these comparisons to generate scores for the hypotheses. Hypotheses having excessive scores are eliminated from further consideration. As noted above, hypotheses that comply with no active constraint grammar also are eliminated.

When the recognizer determines that a word of a hypothesis has ended, the recognizer requests from the pre-filtering procedure a list of words that may have been spoken just after the ending-time of the word. The recognizer then generates a new hypothesis for each word on the list, where each new hypothesis includes the words of the old hypothesis plus the corresponding new word from the list.

In generating the score for a hypothesis, the recognizer uses acoustic scores for words of the hypothesis, a language model score that indicates the likelihood that words of the hypothesis are used together, and scores provided for each word of the hypothesis by the pre-filtering procedure. The recognizer may eliminate any hypothesis that is associated with a constraint grammar (for example, a command hypothesis), but does not comply with the constraint grammar.

Figure 4:
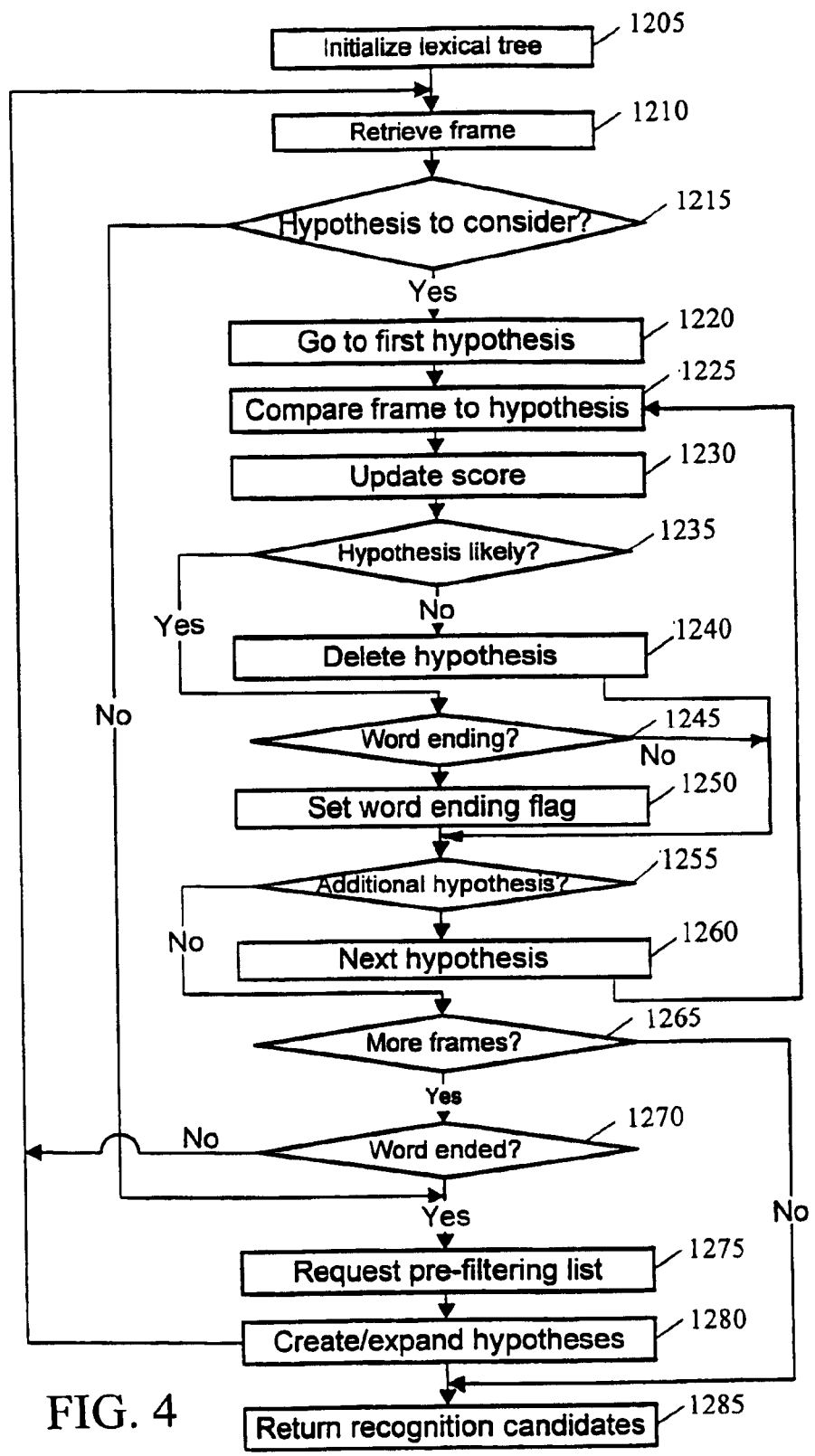
FIG. 4 is a flow chart of a speech recognition procedure.

Referring to FIG. 4, the recognizer 215 may operate according to a procedure 1200. First, prior to processing, the recognizer 215 initializes a lexical tree (step 1205). The recognizer 215 then retrieves a frame of parameters (step 1210) and determines whether there are hypotheses to be considered for the frame (step 1215). The first frame always corresponds to silence so that there are no hypotheses to be considered for the first frame.

If hypotheses need to be considered for the frame (step 1215), the recognizer 215 goes to the first hypothesis (step 1220). The recognizer then compares the frame to acoustic models 235 for the last word of the hypothesis (step 1225) and, based on the comparison, updates a score associated with the hypothesis (step 1230).

After updating the score (step 1230), the recognizer determines whether the user was likely to have spoken the word or words corresponding to the hypothesis (step 1235). The recognizer makes this determination by comparing the current score for the hypothesis to a threshold value. If the score exceeds the threshold value, then the recognizer 215 determines that the hypothesis is too unlikely to merit further consideration and deletes the hypothesis (step 1240).

If the recognizer determines that the word or words corresponding to the hypothesis were likely to have been spoken by the user, then the recognizer determines whether the last word of the hypothesis is ending (step 1245). The recognizer determines that a word is ending when the frame corresponds to the last component of the model for the word. If the recognizer determines that a word is ending (step 1245), the recognizer sets a flag that indicates that the next frame may correspond to the beginning of a word (step 1250).

If there are additional hypotheses to be considered for the frame (step 1255), then the recognizer selects the next hypothesis (step 1260) and repeats the comparison (step 1225) and other steps. If there are no more hypotheses to be considered for the frame (step 1255), then the recognizer determines whether there are more frames to be considered for the utterance (step 1265). The recognizer determines that there are more frames to be considered when two conditions are met. First, more frames must be available. Second, the best scoring node for the current frame or for one or more of a predetermined number of immediately preceding frames must have been a node other than the silence node (that is, the utterance has ended when the silence node is the best scoring node for the current frame and for a predetermined number of consecutive preceding frames).

If there are more frames to be considered (step 1265) and the flag indicating that a word has ended is set (step 1270), or if there were no hypotheses to be considered for the frame (step 1215), then the recognizer requests from the pre-filtering procedure 240 a list of words that may start with the next frame (step 1275).

Upon receiving the list of words from the pre-filtering procedure, the recognizer uses the list of words to create hypotheses or to expand any hypothesis for which a word has ended (step 1280). Each word in the list of words has an associated score. The recognizer uses the list score to adjust the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer compares the hypotheses to the active constraint grammars 225 and abandons any hypothesis that corresponds to no active constraint grammar. The recognizer then retrieves the next frame (step 1210) and repeats the procedure.

If there are no more speech frames to process, then the recognizer 215 provides the most likely hypotheses to the control/interface module 220 as recognition candidates (step 1285).

The control/interface module 220 controls operation of the speech recognition software and provides an interface to other software or to the user. The control/interface module receives the list of recognition candidates for each utterance from the recognizer. Recognition candidates may correspond to dictated text, speech recognition commands, or external commands. When the best-scoring recognition candidate corresponds to dictated text, the control/interface module provides the text to an active application, such as a word processor. The control/interface module also may display the best-scoring recognition candidate to the user through a graphical user interface. When the best-scoring recognition candidate is a command, the control/interface module 220 implements the command. For example, the control/interface module may control operation of the speech recognition software in response to speech recognition commands (for example, "wake up", "make that"), and may forward external commands to the appropriate software.

The control/interface module also controls the active vocabulary, acoustic models, and constraint grammars that are used by the recognizer. For example, when the speech recognition software is being used in conjunction with a particular application (for example, MICROSOFT WORD), the control/interface module updates the active vocabulary to include command words associated with that application and activates constraint grammars associated with the application.

Other functions provided by the control/interface module 220 may include a vocabulary customizer and a vocabulary manager. The vocabulary customizer optimizes the language model of a specific topic by scanning user supplied text. The vocabulary manager is a developer tool that is used to browse and manipulate vocabularies, grammars, and macros. Each such function of the control/interface module 220 may be implemented as an executable program that is separate from the main speech recognition software. Similarly, the control/interface module 220 also may be implemented as a separate executable program.

The control/interface module 220 also may provide an enrollment program that uses an enrollment text and a corresponding enrollment grammar to customize the speech recognition software to a specific user. The enrollment program may operate in an interactive mode that guides the user through the enrollment process, or in a non-interactive mode that permits the user to enroll independently of the computer. In the interactive mode, the enrollment program displays the enrollment text to the user and the user reads the displayed text. As the user reads, the recognizer 215 uses the enrollment grammar to match a sequence of utterances by the user to sequential portions of the enrollment text. When the recognizer 215 is unsuccessful, the enrollment program prompts the user to repeat certain passages of the text. The recognizer uses acoustic information from the user's utterances to train or adapt acoustic models 235 based on the matched portions of the enrollment text. One type of interactive enrollment program is discussed in U.S. Pat. No.

6,212,498, entitled "ENROLLMENT IN SPEECH RECOGNITION" and issued Apr. 3, 2001, which is incorporated herein by reference.

In the non-interactive mode, the user reads the text without prompting from the computer. This offers the considerable advantage that, in addition to reading text displayed by the computer, the user can read from a printed text independent of the computer. Thus, the user could read the enrollment text into a portable recording device and later download the recorded information into the computer for processing by the recognizer. In addition, the user is not required to read every word of the enrollment text, and may skip words or paragraphs as desired. The user also may repeat portions of the text. This adds substantial flexibility to the enrollment process.

The enrollment program may provide a list of enrollment texts, each of which has a corresponding enrollment grammar, for the user's selection. Alternatively, the user may input an enrollment text from another source. In this case, the enrollment program may generate the enrollment grammar from the input enrollment text, or may employ a previously generated enrollment grammar.

The control/interface module 220 may also implement error correction and cursor/position manipulation procedures of the software 160. Error correction procedures include a "make that" command and a "spell that" command. Cursor/position manipulation procedures include the "select" command discussed above and variations thereof (for example, "select [start] through [end]"), "insert before/after" commands, and a "resume with" command.

During error correction, word searches of the backup vocabularies start with the user-specific backup dictionary and then check the system-wide backup dictionary. The backup dictionaries also are searched when there are new words in text that a user has typed.

When the system makes a recognition error, the user may invoke an appropriate correction command to remedy the error. Various correction commands are discussed in U.S. Pat. No. 5,794,189, entitled "CONTINUOUS SPEECH RECOGNITION" and issued Aug. 11, 1998, U.S. Pat. No. 6,064,959, entitled "ERROR CORRECTION IN SPEECH RECOGNITION" and issued May 16, 2000, and U.S. application Ser. No. 09/094,611, entitled "POSITION MANIPULATION IN SPEECH RECOGNITION" and filed Jun. 15, 1998, all of which are incorporated herein by reference.

Figure 5:
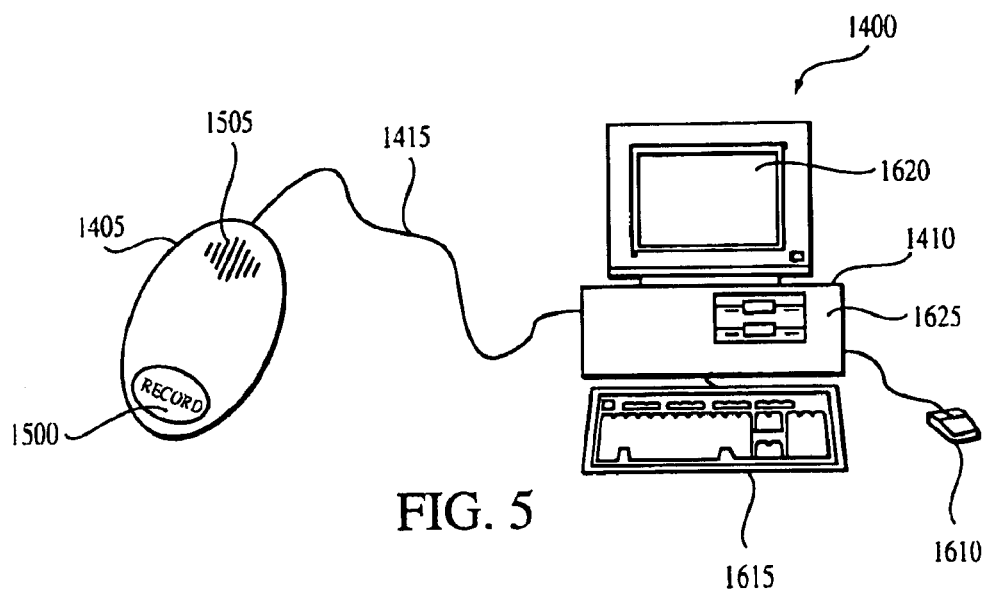
FIG. 5 is a block diagram of a speech recognition system.

Referring to FIG. 5, the speech recognition system may be implemented using a system 1400 for performing recorded actions that includes a pocket-sized recorder 1405 and a computer 1410 (not shown to scale). When data is to be transmitted, the recorder 1405 may be connected to the computer 1410 using a cable 1415. Other data transmission techniques, such as infrared data transmission, also may be used.

In the described implementation, the recorder 1405 is a digital recorder having time stamp capabilities. One recorder meeting these criteria is the DRAGON NATURALLY MOBILE POCKET RECORDER R1 manufactured for Dragon Systems, Inc., of Newton, Mass. by Voice It Worldwide, Inc. In other implementations, the recorder may be a digital recorder lacking time stamp capabilities, or an analog recorder using a magnetic tape.

The following FIGS. 5–8 illustrate systems that include one or more of the following: a microphone 1505, a mouse 1610, a keyboard 1615, a display 1620, and a console 1625. The microphone 1505 is described below with respect to FIG. 9, and the mouse 1610, keyboard 1615, display 1620, and console 1625 are described below with respect to FIG. 10.

Figure 6:
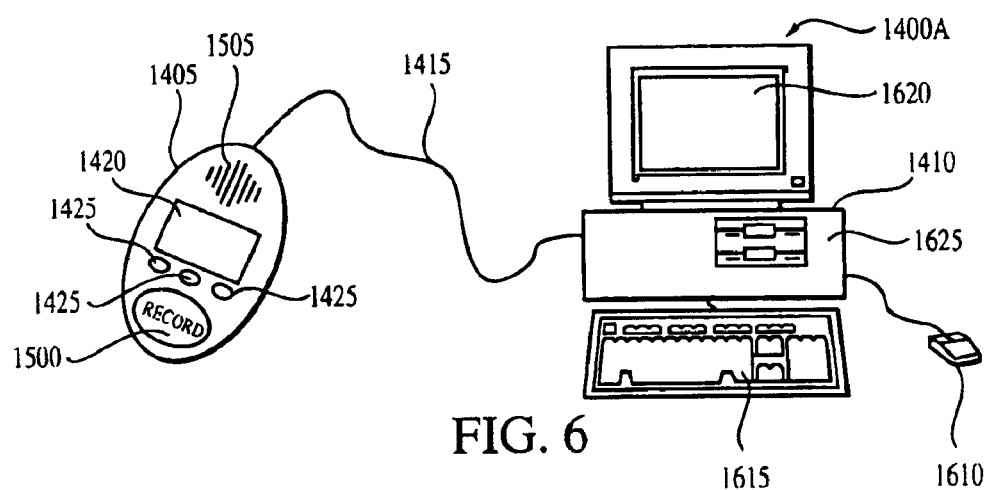
FIGS. 6–8 are block diagrams of other implementations of the system of FIG. 5.

FIG. 6 illustrates a variation 1400A of the system in which an output device 1420 is attached to the recorder 1405. Information about action items recorded using the recorder 1405 and processed by the computer 1410 is transferred automatically via the cable 1415 for display on the output device 1420. This variation permits the user to access, for example, appointments and contact information using the display 1420. Keys 1425 on the recorder are used to navigate through displayed information.

Figure 7:
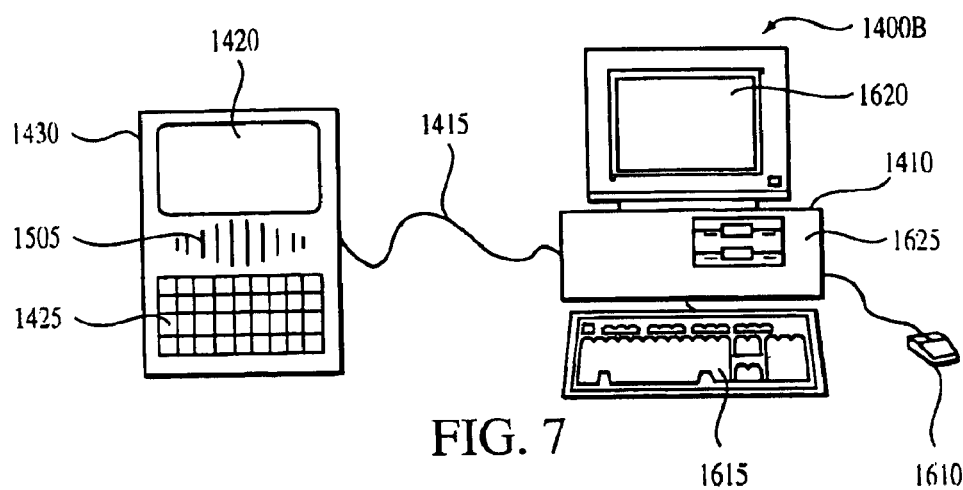

FIG. 7 illustrates another variation 1400B in which the recording and output functionality are implemented using a PDA or a hand-held computer 1430. With this variation, it is contemplated that some instances of the hand-held computer 1430 may have sufficient processing capacity to perform some or all of the speech recognition, parsing, and other processing tasks described below.

Figure 8:
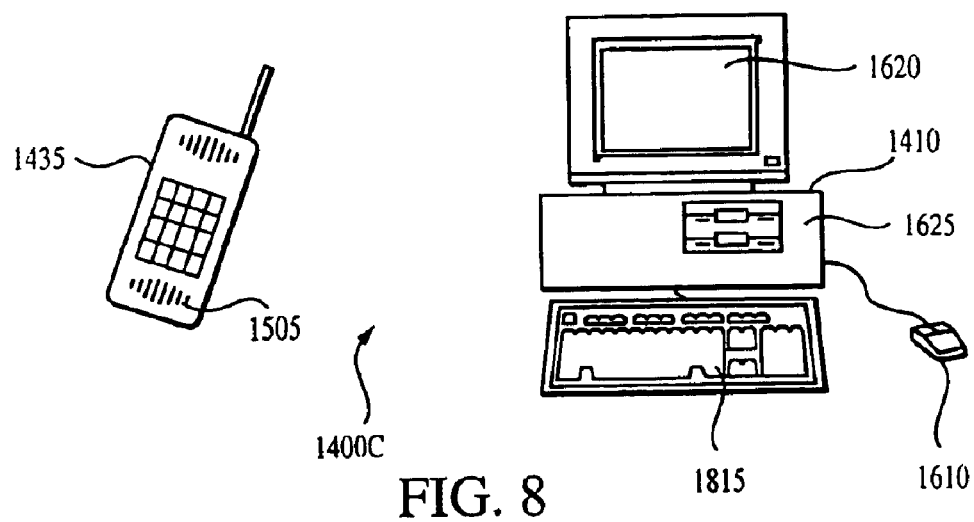

FIG. 8 illustrates another variation 1400C in which the user's speech is immediately transmitted to the computer 1410 using, for example, a cellular telephone 1435. This variation permits the user to dictate actions over an extended period that might exceed the capacity of a recorder. Audio feedback may be provided to permit immediate review of an action item, interactive correction, and performance of the action item. The interactive correction may be provided using spoken commands, telephone key strokes, or a combination of the two.

Figure 9:
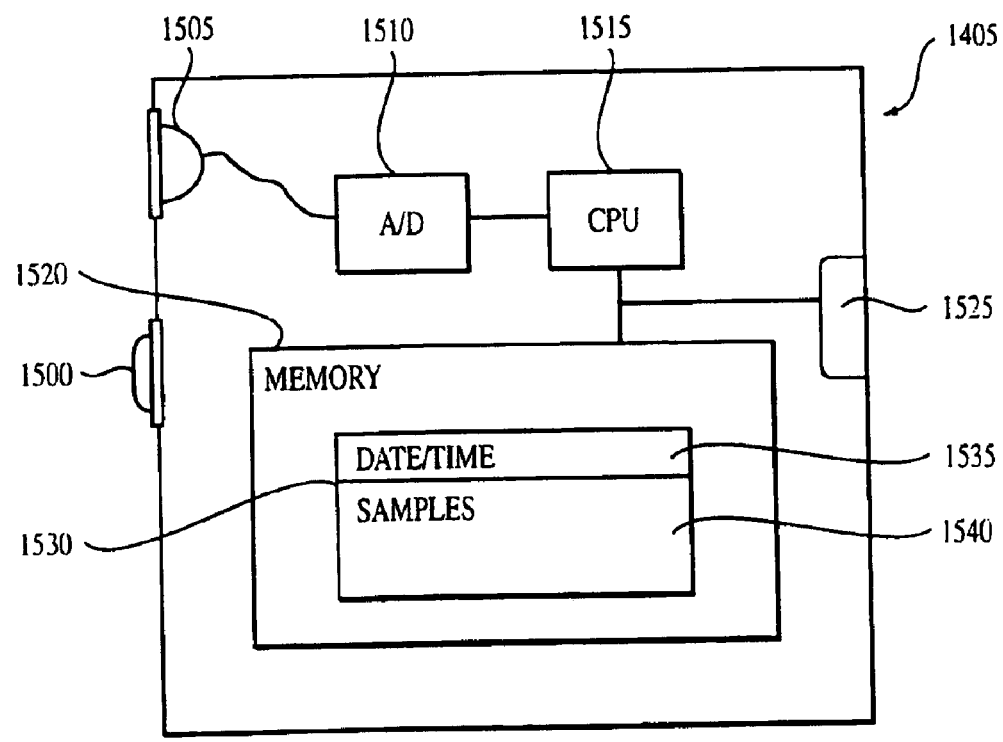
FIG. 9 is a block diagram of a recorder of the system of FIG. 5.

Referring also to FIG. 9, the recorder 1405 includes a record button 1500 that activates the recorder, a microphone 1505 that converts a user's speech into an analog electrical signal, an analog-to-digital converter 1510 that converts the analog electrical signal into a series of digital samples, a processor 1515, a memory 1520, and an output port 1525 for connection to the cable 1415. When the user presses the record button 1500 and speaks into the microphone 1505, the processor creates a file 1530 in memory 1520 and stores in the file a time stamp 1535 corresponding to the time at which the button was pressed in the file. The processor then stores the digital samples 1540 corresponding to the user's speech in the same file. In some implementations, the processor uses compression techniques to compress the digital samples to reduce storage and data transfer requirements. The user may use the recorder multiple times before transferring data to the computer 1410.

Figure 10:
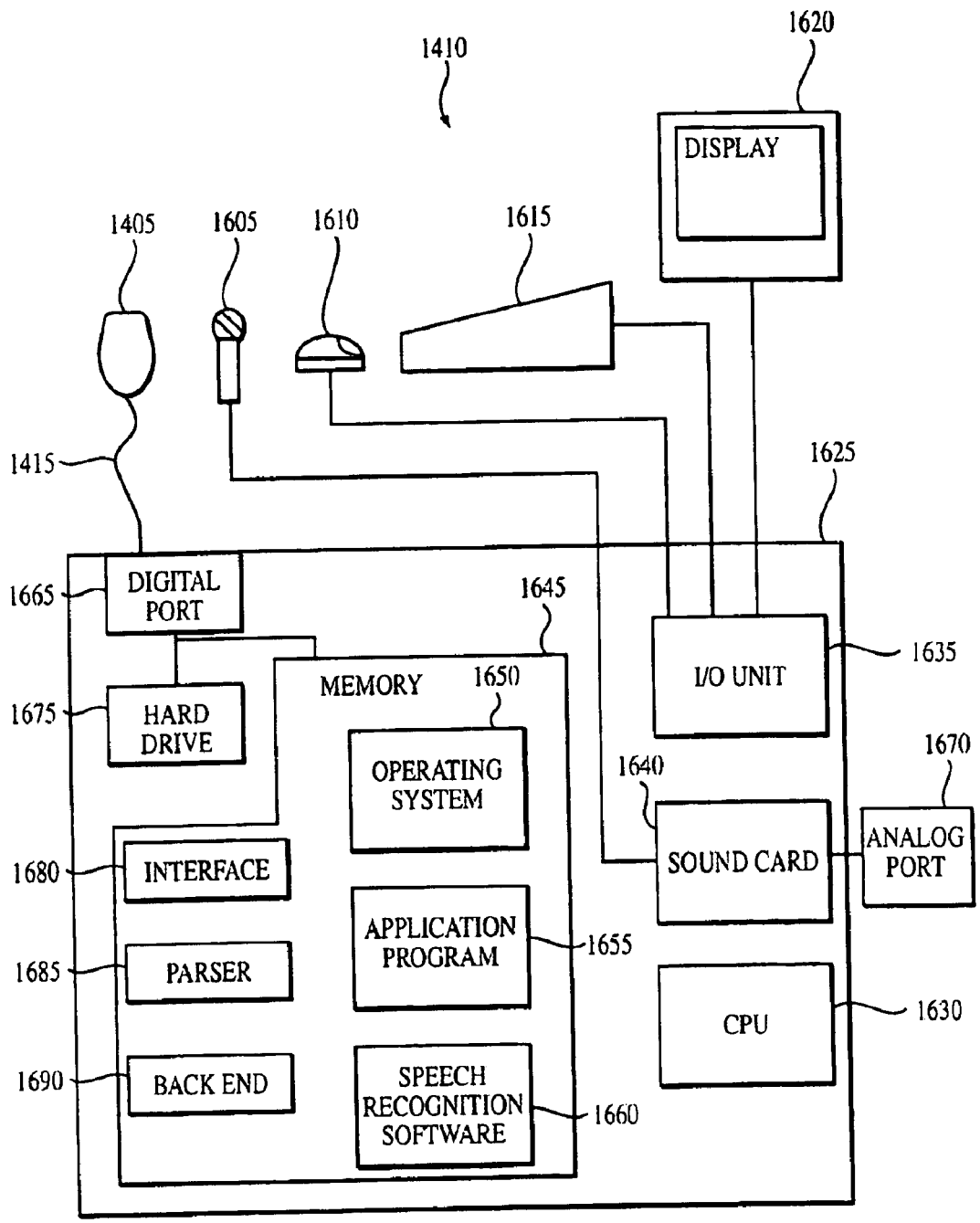
FIG. 10 is a block diagram of a computer of the system of FIG. 5.

Referring also to FIG. 10, the computer 1410 may be a standard desktop computer. In general, such a computer includes input/output (I/O) devices (for example, microphone 1605, mouse 1610, keyboard 1615, and display 1620) and a console 1625 having a processor 1630, an I/O unit 1635 and a sound card 1640. A memory 1645 stores data and programs such as an operating system 1650, an application program 1655 (for example, a word processing program), and speech recognition software 1660.

The computer 1410 may be used for traditional speech recognition. In this case, the microphone 1605 receives the user's speech and conveys the speech, in the form of an analog signal, to the sound card 1640, which in turn passes the signal through an analog-to-digital (A/D) converter to transform the analog signal into a set of digital samples. Under control of the operating system 1650 and the speech recognition software 1660, the processor 1630 identifies utterances in the user's continuous speech. Utterances are separated from one another by a pause having a sufficiently large, predetermined duration (for example, 160–250 milliseconds). Each utterance may include one or more words of the user's speech.

The system also includes a digital recorder port 1665 and/or an analog recorder port 1670 for connection to the cable 1415. The digital recorder port 1665 is used to transfer files generated using the recorder 1405. These files may be transferred directly into memory 1645, or to a storage device such as hard drive 1675. The analog recorder port 1670 is connected to the sound card 1640 and is used to transmit speech recorded using an analog or digital recorder to the sound card. The analog recorder port may be implemented using a line in port. The hand-held recorder is connected to the port using a cable connected between the line in port and a line out or speaker port of the recorder. The analog recorder port also may be implemented using a microphone, such as the microphone 1605. Alternatively, the analog recorder port 1670 may be implemented as a tape player that receives a tape recorded using a hand-held recorder and transmits information recorded on the tape to the sound card 1640.

To implement the speech recognition and processing functions of the system 1400, the computer 1410 runs interface software 1680, the speech recognition software 1660, a parser 1685, and back-end software 1690. DRAGON NATUALLYSPEAKING Preferred Edition 3.1, available from Dragon Systems, Inc. of Newton, Mass., offers one example of suitable speech recognition software. The interface software 1680 provides a user interface for controlling the transfer of data from the digital recorder and the generation of action items for use by the back-end software 1690. In general, the user interface may be controlled using input devices such as a mouse or keyboard, or using voice commands processed by the speech recognition software.

After transferring data from the recorder, the interface software 1680 provides the digital samples for an action item to the speech recognition software 1660. If the digital samples have been stored using compression techniques, the interface software 1680 decompresses them prior to providing them to the speech recognition software. In general, the speech recognition software analyzes the digital samples to produce a sequence of text, and provides this sequence to the interface software 1680. The interface software 1680 then transfers the text and the associated time stamp, if any, to the parser 1685, which processes the text in conjunction with the time stamp to generate a parsed version of the action item. The parser returns the parsed action item to the interface software, which displays it to the user. After any editing by the user, and with user approval, the interface software then transfers the action item to the appropriate back-end software 1690. An example of back-end software with which the system works is personal information management software, such as MICROSOFT OUTLOOK, which is available from Microsoft Corporation of Redmond, Wash. Other suitable back-end software includes contact management software, time management software, expense reporting applications, electronic mail programs, and fax programs.

Various systems for recognizing recorded speech and performing actions identified in the speech are discussed in U.S. application Ser. No. 09/432,155, entitled "PERFORMING RECORDED ACTIONS" and filed Jun. 10, 1999, which is incorporated herein by reference.

A user may dictate a document into an audio recorder such as recorder 1405 and then may download the dictated audio information into a speech recognition system like the one described above. Likewise, the user may dictate a document directly into a microphone connected to the speech recognition system, which may be implemented in a desktop computer or a hand-held electronic device.

In a large vocabulary continuous speech recognition system, the user may correct misrecognition errors by selecting a range of characters from the speech recognition results. The speech recognition system presents a list of alternative recognitions for that selected range of characters by, for example, opening the correction window with a choice list.

This type of error correction is used in Dragon NaturallySpeaking™ and other commercial large vocabulary continuous speech recognition systems currently on the market. Correction in speech recognition systems typically requires the user to perform two steps. First, the user identifies the range of words that are incorrect, which may be referred to as an error-filled region. The error-filled region includes a beginning character position and an ending character position. Second, the user selects a replacement from a list of alternatives for the selected error-filled region.

Correction in the speech recognition system may include a feature called "double click to correct," in which the user double clicks on the first word of the error-filled region in order to correct two or more words in the recognition result. (In a system, such as one employing a handheld device, in which a stylus is used instead of a mouse, this feature may be implemented by tapping, or double tapping, the stylus on the first word in the error-filled region.) The speech recognition system automatically selects n words from the user's document beginning with the word that was selected, where n is a predetermined integer that indicates the number of selected words. In an implementation in which n equals three, the speech recognition system displays a list of alternative recognition results, where each alternative recognition result replaces the three words that begin at the location of the word the user selected.

Although the double-click-to-correct feature relieves the user of the burden of having to select the end of the error-filled region, the end of the error-filled region is always computed to be the end of the group of n words including the word that was selected. Accordingly, the selected range of words to be corrected (that is, n words including the selected word) may be larger than the actual error-filled region, thus complicating the error correction process. In some cases, the selected range of words to be corrected (n words including the selected word) may be smaller than the actual error-filled region, thus forcing the user to cancel the list of alternatives and directly reselect the appropriate range of characters.

The following description provides a discussion of additional systems and methods that may be implemented to further improve error correction in speech recognition. These additional systems and methods may be implemented to correct errors in any speech recognition environment, and are not limited to the speech recognition systems described in detail and referenced above.

Choice List for Recognition Results

Figure 11A:
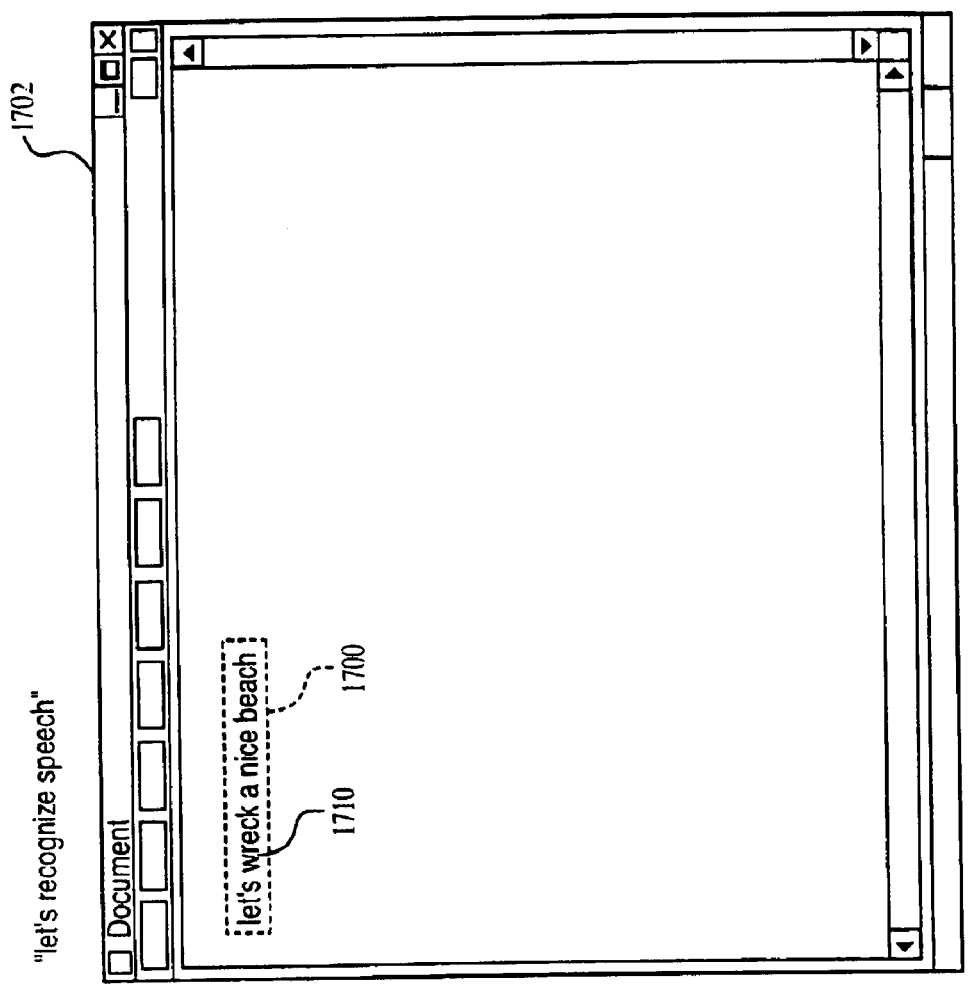

In the example shown in FIG. 11A, the recognizer 215 misrecognizes the sentence "let's recognize speech" and the control/interface module 220 responds by inserting the incorrect text "let's wreck a nice beach" 1700 in dictation window 1702. In a conventional speech recognition system, as shown in FIG. 11B, the user causes the control/interface module 220 to generate a choice list 1705 by selecting the word "wreck" 1710 in the recognition result 1700. The choice list 1705 includes a list of alternative recognition candidates for the word "wreck" 1710.

A speech recognition system may determine the error-filled region on the fly during correction. In this way, the user selects (by clicking, double-clicking, tapping, double tapping, or in some other way) the first word in an error-filled region and the speech recognition system automatically computes a width of the error-filled region to determine alternative recognition results. The number of words in each of the alternative recognition results in the choice list varies (that is, the length of each of the elements in the choice list is floating) because there is no rigidly defined end to the error-filled region.

Figure 11C:
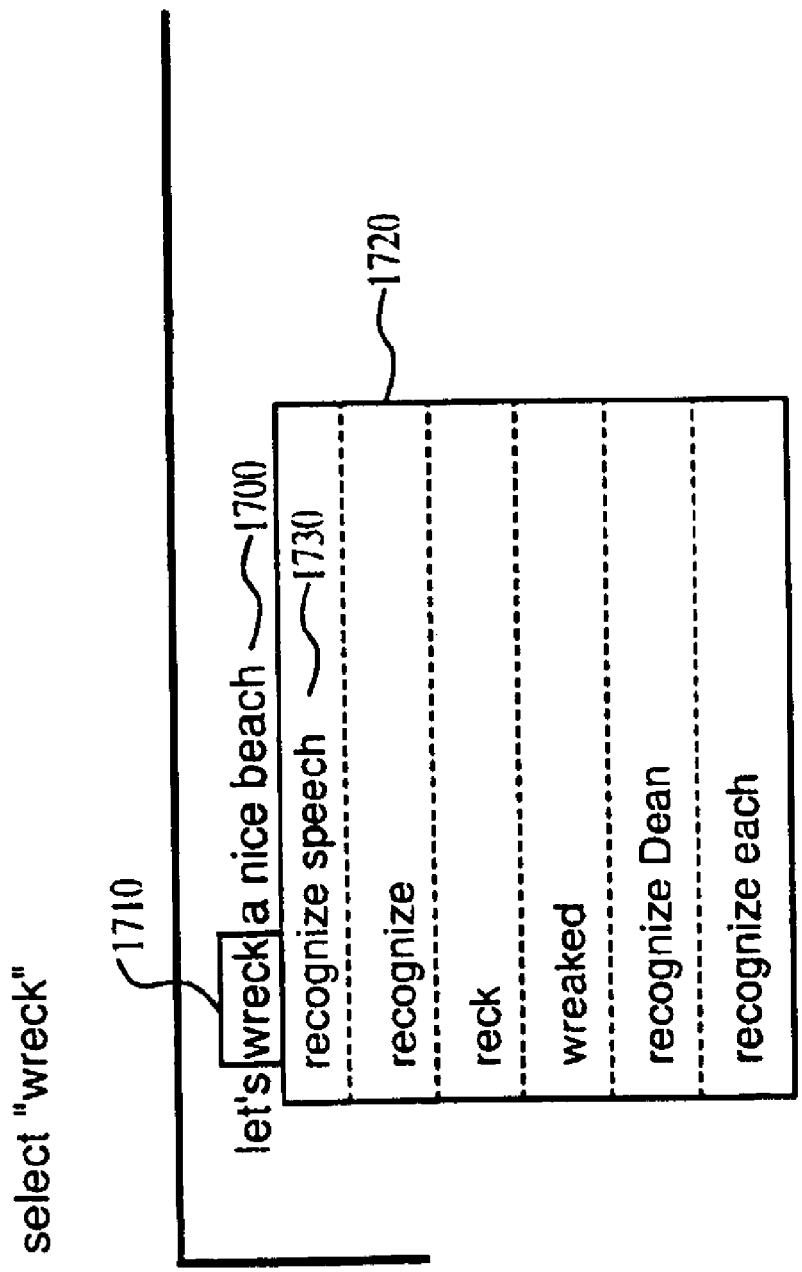

In FIG. 11C, a speech recognition system has provided an improved list 1720 (also referred to as a "floating choice list") of alternatives for the selected word ("wreck") 1710. The improved list 1720 includes alternatives for the selected word 1710 along with alternatives for one or more words following "wreck" in the document. In this way, the user need not identify the end of an error-filled region. For example, the first entry 1730 in the choice list is "recognize speech."

Figure 12:
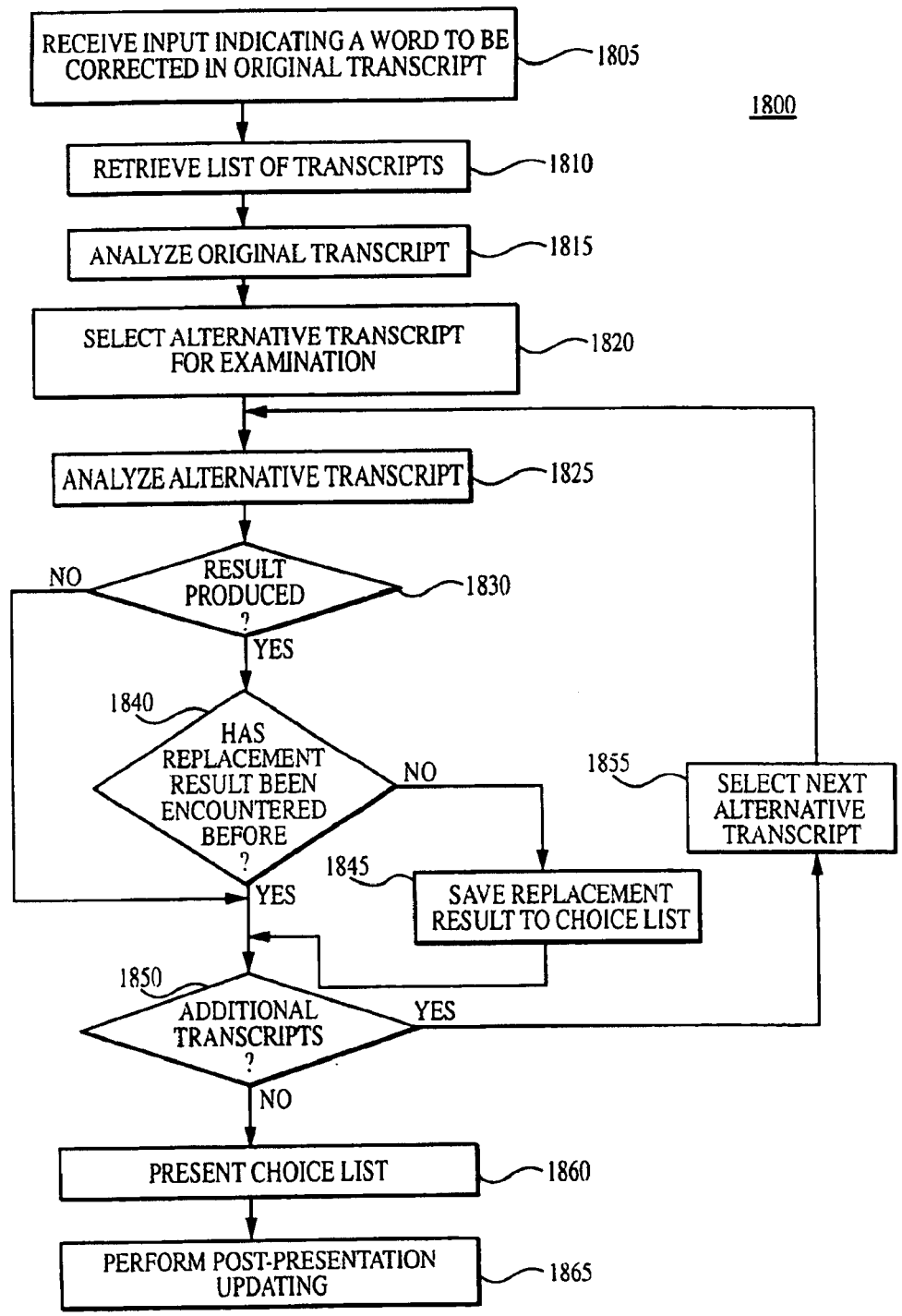
FIGS. 12 and 16 are flow charts of procedures implemented by a speech recognition system such as the system shown in FIG. 5.

Referring to FIG. 12, the speech recognition system performs a procedure 1800 for providing the floating choice list. Initially, the speech recognition system receives input from a user indicating an incorrect word in an original transcript (step 1805). For example, the user may position a cursor on the screen over a word to select the incorrect word. The speech recognition system converts the screen coordinate into a character position in the original transcript. Then, using that character position, the speech recognition system finds the beginning of the word that includes that character position—this word corresponds to the incorrect word.

The speech recognition system retrieves a list of transcripts based on the indicated incorrect word (step 1810). The speech recognition system accomplishes this retrieval by first retrieving a result object that created the incorrect word and includes the character position. Each transcript includes a sequence of words and start times (called index times), where a start time is associated with each word in the transcript. The index time may be given in units of milliseconds relative to the start of an utterance.

Figure 13:
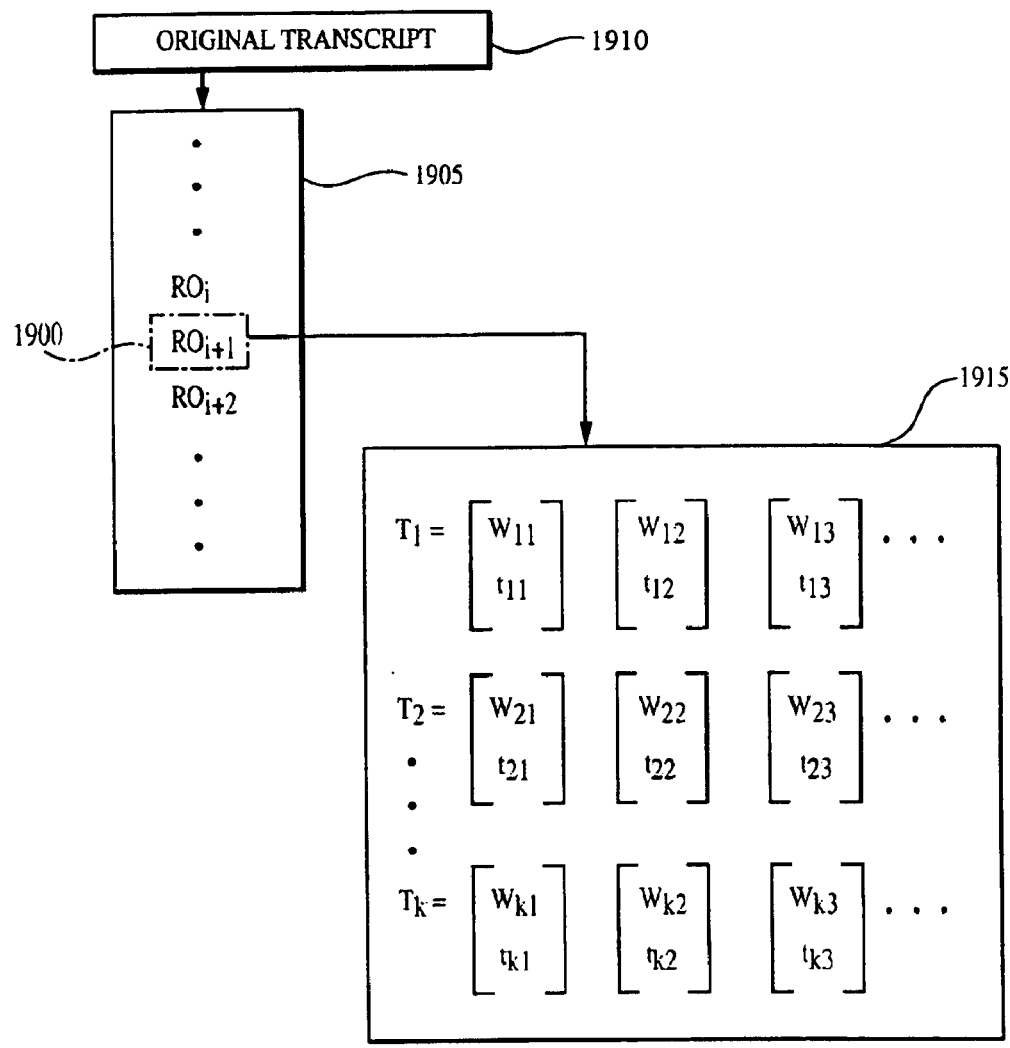
FIG. 13 is a block diagram of a procedure for retrieving transcripts from a speech recognition result determined using the procedures of FIGS. 12 and 16.

For example, referring to FIG. 13, a result object 1900 is retrieved from an array 1905 of result objects for an original transcript 1910, where each result object 1900 describes a recognition. A list 1915 of transcripts for result object 1900 is retrieved. Each transcript in the list includes a set of one or more words ($W_{ij}$) and associated index times ($t_{ij}$), where the index i indicates the transcript and the index j indicates the word in the transcript. The first (or original) transcript in the list 1915 of transcripts corresponds to the best-scoring recognition result presented to the user. The remaining transcripts in the list 1915 correspond to alternative transcripts that will be compared to the original transcript in subsequent analysis by the speech recognition system.

Referring again to FIG. 12, after the list of transcripts is retrieved (step 1810), the speech recognition system analyzes the original transcript to determine the index time of the incorrect word (step 1815). The speech recognition system then selects one of the alternative transcripts from the list of transcripts for analysis (step 1820). In one implementation, the speech recognition system selects the next best-scoring alternative transcript from the list of transcripts.

After the alternative transcript is selected (step 1820), the speech recognition system analyzes the alternative transcript (step 1825) by searching for an end of an error-filled region that begins with a word whose index time most closely matches that of the incorrect word selected by the user. As discussed in detail below, the speech recognition system searches for the location at which that alternative result transcript resynchronizes, or matches in time, with the original transcript. The speech recognition system searches forward in both the original transcript and the alternative transcript until the system finds a word that is the same in both transcripts and that begins at approximately the same time in both transcripts. If the speech recognition system finds such a word, then the speech recognition system produces a replacement result that extends from the selected word to the matching word. The speech recognition system may also produce a replacement result when the incorrect word is positioned near the end of the original transcript, with the replacement result extending from the selected word to the end of the transcript.

If the speech recognition system produces a replacement result (step 1830), the speech recognition system compares the replacement result to other replacement results (step 1840). If the replacement result has not been encountered before (step 1840), the speech recognition system saves the replacement result to the choice list (step 1845) and checks for additional alternative transcripts (step 1850). The system also checks for additional alternative transcripts (step 1850) if the replacement result has been encountered before and, therefore, is not saved (step 1840), or if the speech recognition system does not produce a replacement result (step 1830).

If there are additional alternative transcripts (step 1850), the speech recognition system selects a next alternative transcript (step 1855) for analysis (step 1825). If there are no additional alternative transcripts for analysis (step 1850), the speech recognition system presents the choice list (step 1860) and performs post-presentation updating (step 1865).

Referring to FIGS. 14 and 15, for example, the speech recognition system has recognized the user's utterance as "I am dictating about the new Yorkshire taste which is delicious," as indicated in the dictation window 2000. The user has selected the word "new" 2005 in dictation window 2000, thus indicating that "new" is a word to be corrected. The speech recognition system has retrieved an original transcript "I am dictating about the new Yorkshire taste which is delicious" 2100 and an alternative transcript "I am dictating about the New York shirt taste which is delicious" 2105.

In FIG. 15, the index times 2110 of the words of the original transcript are shown below the words of the original transcript 2100 and the index times 2115 of the words in the alternative transcript 2105 are shown below the words of the alternative transcript. After the occurrence of the word "new," the alternative transcript resynchronizes with the original transcript at the word "taste" because the word "taste" in transcript 2100 and the word "taste" in transcript 2105 occur at approximately the same index time. Thus, because the alternative transcript resynchronizes with the original transcript at the word "taste," the speech recognition system computes the end of the error-filled region of the alternative transcript 2105 to be at the word "taste."

As shown in FIG. 14, the speech recognition system produces a list of replacement results including replacement result "New York shirt" 2007 for the transcript 2105 and presents the list of replacement results in a choice list 2010.

Figure 16:
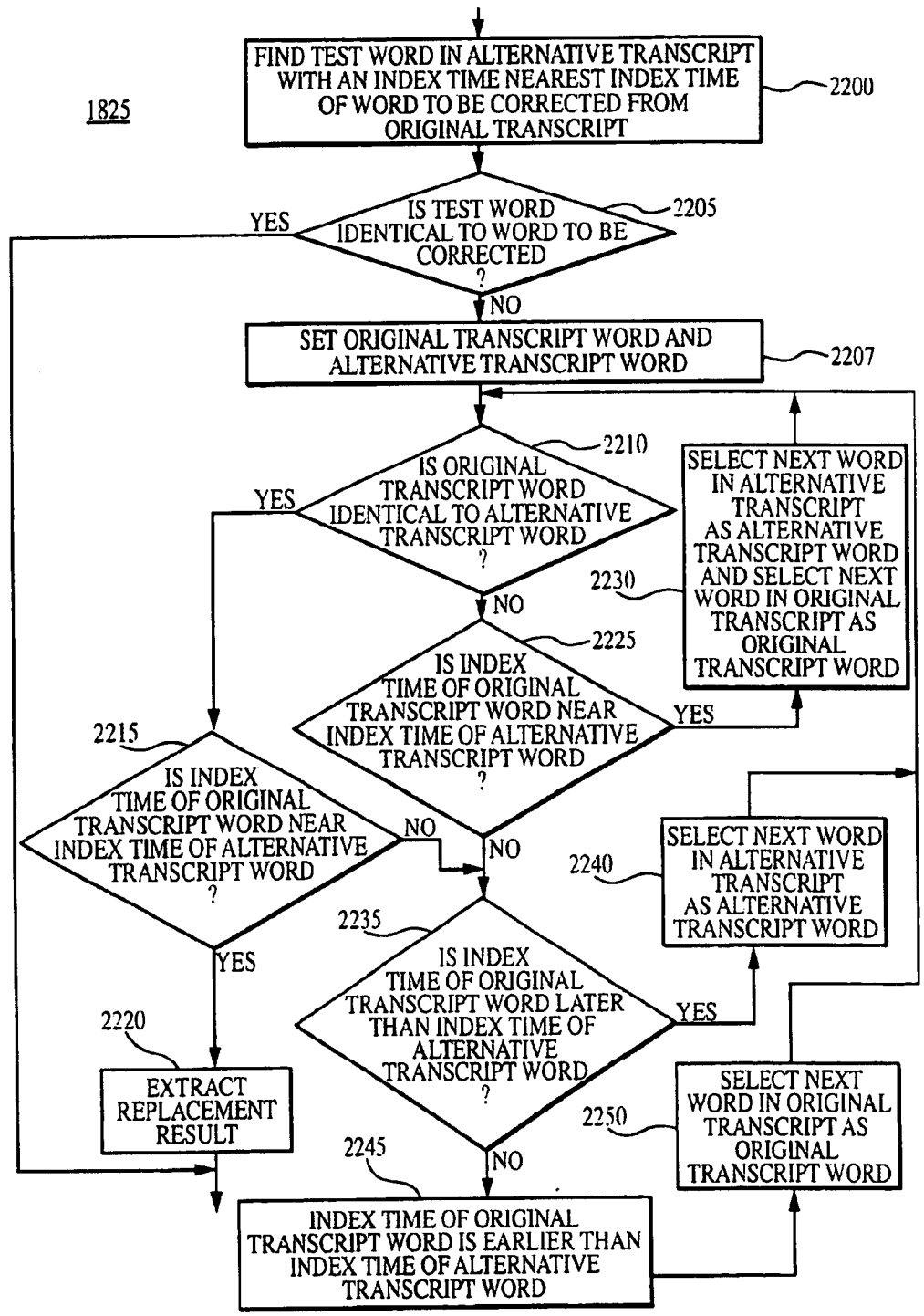

Referring also to FIG. 16, the speech recognition system performs a procedure 1825 for analyzing the alternative transcript. First, the speech recognition system finds a test word in the alternative transcript that has an index time nearest to the index time of the word to be corrected from the original transcript (step 2200). If the test word is identical to the word to be corrected (step 2205), then the speech recognition system ignores the alternative transcript and exits the procedure 1825.

If the test word is not identical to the word to be corrected (step 2205), then the speech recognition system designates a word immediately following the word to be corrected in the original transcript as an original transcript word and designates a word immediately following the test word in the alternative transcript as an alternative transcript word for subsequent analysis (step 2207). The speech recognition system then determines if the original transcript word is identical to the alternative transcript word (step 2210).

If the original transcript word is identical to the alternative transcript word (step 2210), the speech recognition system computes whether the index time of the original transcript word is near the index time of the alternative transcript word (step 2215). If the index times of the original transcript word and the alternative transcript word are near each other (step 2215), then the speech recognition system extracts a replacement result that begins with the test word and ends with the word prior to the alternative transcript word (step 2220).

The required level of nearness between the index times may be controlled using a parameter that may be manually adjusted and fine-tuned by a developer of the speech recognition system. For example, the system may calculate a difference between index times for different words, and may designate index times as near each other when this difference is less than a threshold amount.

If the original transcript word is not identical to the alternative transcript word (step 2210), then the speech recognition system computes whether the index time of the original transcript word is near the index time of the alternative transcript word (step 2225). If the index times of the original transcript word and the alternative transcript word are near each other (step 2225), then the speech recognition system selects the word adjacent to the original transcript word in the original transcript as the original transcript word for subsequent analysis and selects the word adjacent to the alternative transcript word in the alternative transcript as the alternative transcript word for subsequent analysis (step 2230).

If the index time of the original transcript word is not near the index time of the alternative transcript word (steps 2215 or 2225), the speech recognition system computes whether the index time of the original transcript word is later than the index time of the alternative transcript word (step 2235).

If the index time of the original transcript word is later than the index time of the alternative transcript word (step 2235), then the speech recognition system designates the word adjacent to the alternative transcript word in the alternative transcript as the alternative transcript word for subsequent analysis (step 2240). If the index time of the original transcript word is not near (steps 2215 or 2225) or is not later than (step 2235) the index time of the alternative transcript word, then the index time of the original transcript word is earlier than the index time of the alternative transcript word (step 2245). In this case, the speech recognition system selects the word adjacent to the original transcript word in the original transcript as the original transcript word for subsequent analysis (step 2250).

The example of FIGS. 14 and 15 will now be analyzed with respect to the procedures 1800 and 1825. In FIG. 14, the speech recognition system has received input from a user indicating that the word "new" 2005 from the original transcript 2100 is to be corrected (step 1805). After selecting alternative transcript 2105 for examination (step 1820), the speech recognition system finds the test word "New York" 2120 (where "New York" is a single lexical entry that is treated as a word by the system) in the alternative transcript 2105 (step 2200). The test word "New York" has an index time of 1892, which is nearest the index time 1892 of the word "new." Next, the speech recognition system compares the test word "New York" to the word "new" to determine that these words are not identical (step 2205). Therefore, the speech recognition system sets the word "Yorkshire" as the original transcript word and sets the word "shirt" as the alternative transcript word (step 2207).

When the speech recognition system compares the word "Yorkshire" to the word "shirt" the speech recognition system determines that these words are not identical (step 2210). Furthermore, because the index time of the word "Yorkshire" is earlier than the index time of the word "shirt" (step 2245), the speech recognition system selects the word "taste," which follows the word "Yorkshire" in the original transcript 2100, and has an index time of 2729, as the original transcript word (step 2250).

At this point, the original transcript word is "taste" with an index of 2729 and the alternative transcript word is "shirt" with an index of 2490. Because the original transcript word and the alternative transcript word are not identical (step 2210), and because the index time of the original transcript word "taste" is later than the index time of the alternative transcript word "shirt" (step 2235), the speech recognition system selects the word "taste," which has an index of 2809 and follows "shirt" in the alternative transcript 2105, as the alternative transcript word (step 2240). At this point, the original transcript word is "taste" with an index of 2729 (from the original transcript 2100) and the alternative transcript word is "taste" with an index of 2809 (from the alternative transcript 2105).

Because the original transcript word and the alternative transcript word are identical to each other (step 2210), and because the index times of the original transcript word and the alternative transcript word are near each other (step 2215), the speech recognition system extracts a replacement result from the alternative transcript 2105 that corresponds to "New York shirt" 2007 (step 2220).

Figure 17:
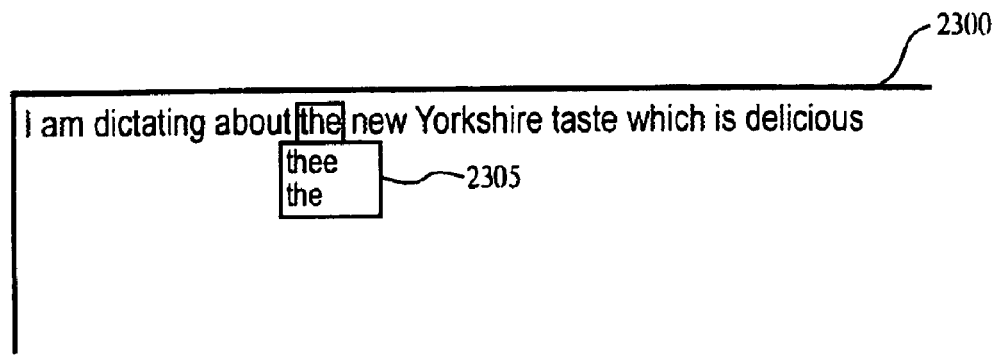

Referring also to FIG. 17, dictation window 2300 is shown in which the user has selected the word "the" to be corrected in the original transcript "I am dictating about the new Yorkshire taste which is delicious." In this case, the speech recognition system has provided a choice list 2305 that includes the replacement result "thee" and the original result "the."

Figure 18:
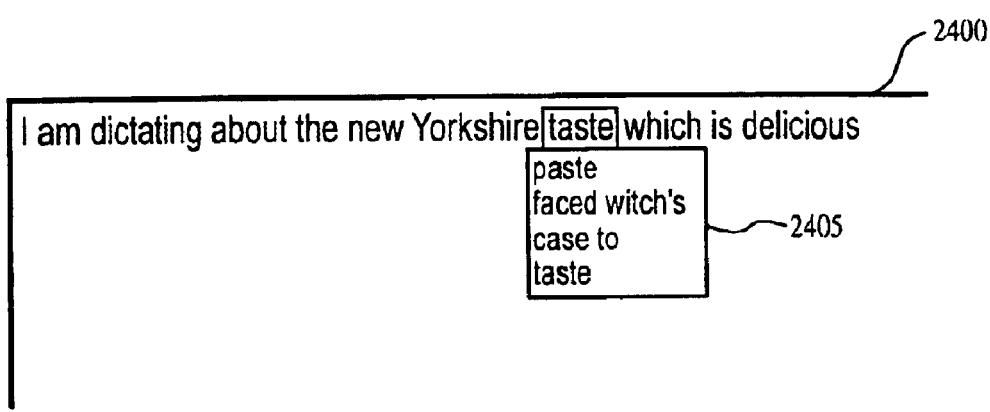

In FIG. 18, for example, a dictation window 2400 is shown in which the user has selected the word "taste" to be corrected in the original transcript "I am dictating about the new Yorkshire taste which is delicious." In this case, the speech recognition system has provided a choice list 2405 that includes the replacement results "paste," "faced witch's," and "case to," and the original result "taste."

Upon receiving input from the user that indicates the word to be corrected, the speech recognition system may highlight the word to be corrected from the original transcript. For example, in FIG. 14, the word "new" is highlighted, in FIG. 17, the word "the" is highlighted, 20 and in FIG. 18, the word "taste" is highlighted.

Figure 19A:
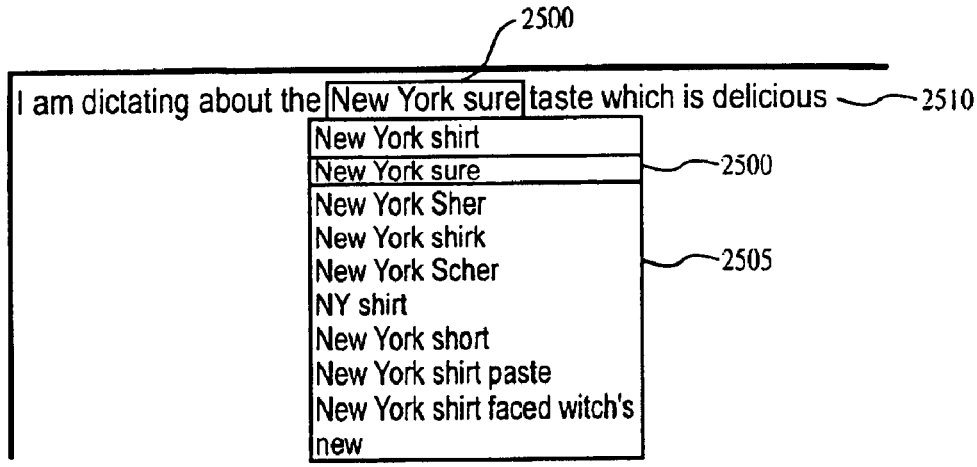
Figure 19B:
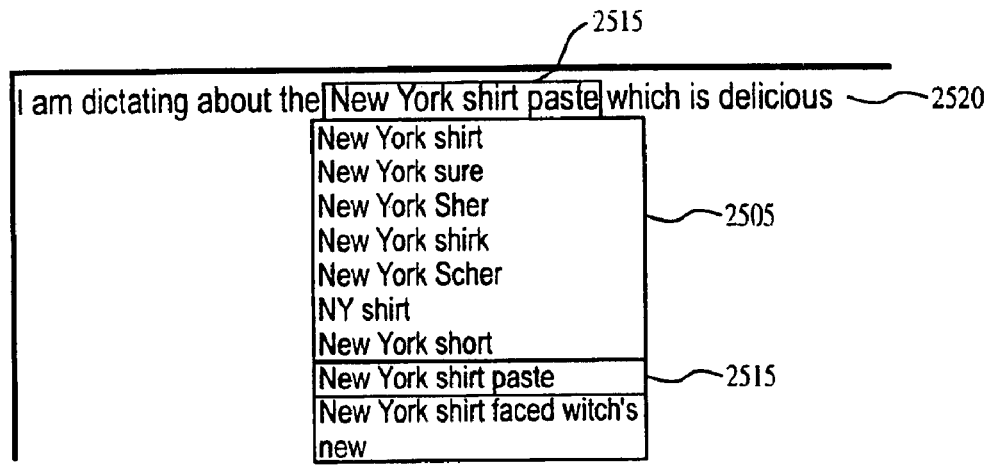
Figure 19C:
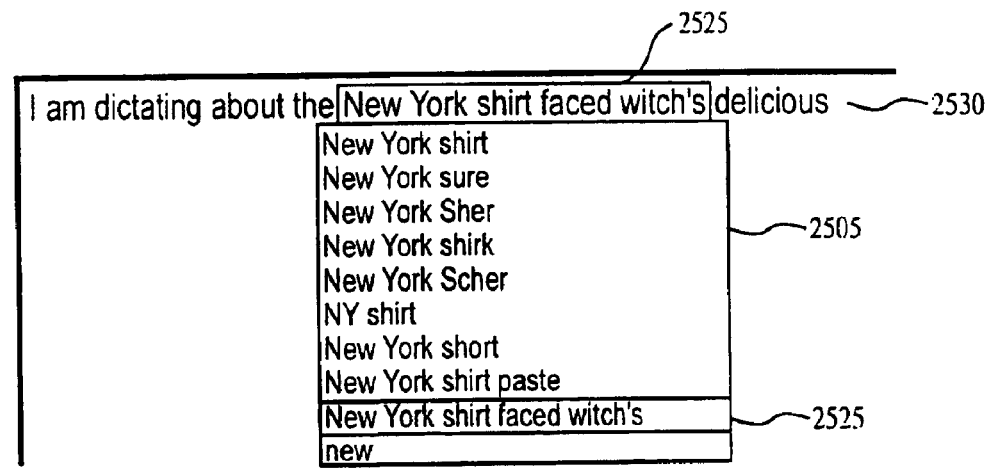

Referring again to FIG. 12, the speech recognition system performs post-presentation updating at step 1865 when the choice list is presented to the user (step 1860). Post-presentation updating includes updating the dictation window transcript to reflect a user selection of a replacement result from the choice list. For example, referring also to FIGS. 19A–19C, the transcript may be updated with the replacement result and the replacement result in the updated transcript may be highlighted when the user selects a replacement result from the choice list. In FIG. 19A, the user selects "New York sure" 2500 from choice list 2505 and the replacement result "New York sure" is highlighted in updated transcript 2510. As shown in FIG. 19B, the user selects "New York shirt paste" 2515 from choice list 2505 and the replacement result "New York shirt paste" is highlighted in updated transcript 2520. In FIG. 19C, the user selects "New York shirt faced witch's" 2525 from choice list 2505 and the replacement result "New York shirt faced witch's" 2525 is highlighted in updated transcript 2530.

As shown in FIGS. 17 and 18, replacement results produced by the speech recognition system during procedure 1800 and shown in the choice lists may include just a single word that either matches the original transcript or does not match the original transcript. Thus, the word "the," which matches the original transcript in FIG. 17, and the word "thee," which does not match the original transcript, are displayed in choice list 2305.

Post-presentation updating (step 1865) may include ending a correction session upon receipt of an indication from the user that an alternative result reflects the user's original intent. For example, the speech recognition system may terminate the correction session when the user clicks (or double clicks) a button that closes the choice list or when the user selects an appropriate alternative result.

Finding Multiple Misrecognitions of Utterances in a Transcript

A user may dictate a document into an audio recorder such as recorder 1405 and then may download the dictated audio information into a speech recognition system like the one described above. Likewise, the user may dictate a document directly into a microphone connected to the speech recognition system, which may be implemented in a desktop computer or a hand-held electronic device. In either case, the speech recognition system may be unable to recognize particular words that are not in the speech recognition system's vocabulary. These words are referred to as out-of-vocabulary (OOV) words.

For example, the speech recognition system's vocabulary may not contain proper names, such as the name "Fooberman," or newer technical terms, such as the terms "edutainment" and "winsock." When it encounters an OOV word, the speech recognition system may represent the word using combinations of words and phonemes in its vocabulary that most closely resemble the OOV word. For example, the speech recognition system may recognize the word "Fooberman" as "glue bar man," in which case the speech recognition system has replaced the phoneme for "f" with the phonemes for "gl" and the phoneme "ûr" with the phoneme "âr".

A user may proofread a text document representing recognized speech to correct OOV words and other misrecognitions within the text document. The user uses a keyboard, a mouse or speech to select what appears to be a misrecognized word, plays back the audio signal that produced the apparently misrecognized word, and then manually corrects the misrecognized word using, for example, a keyboard or speech. The user performs this manual correction for each apparently misrecognized word in the text document. The user must remain alert while reading over the text document because it is sometimes difficult to detect a misrecognized word. This may be particularly important when detecting OOV words, which tend to be uncommon.

Optionally, the user (or the speech recognition system) may add the OOV word to the speech recognition system's vocabulary once the user realizes that the system has misrecognized the word. The speech recognition system may then re-recognize the whole text document using a new vocabulary that now includes what was previously an OOV word. This re-recognition process may take a relatively long time.

Figure 20:
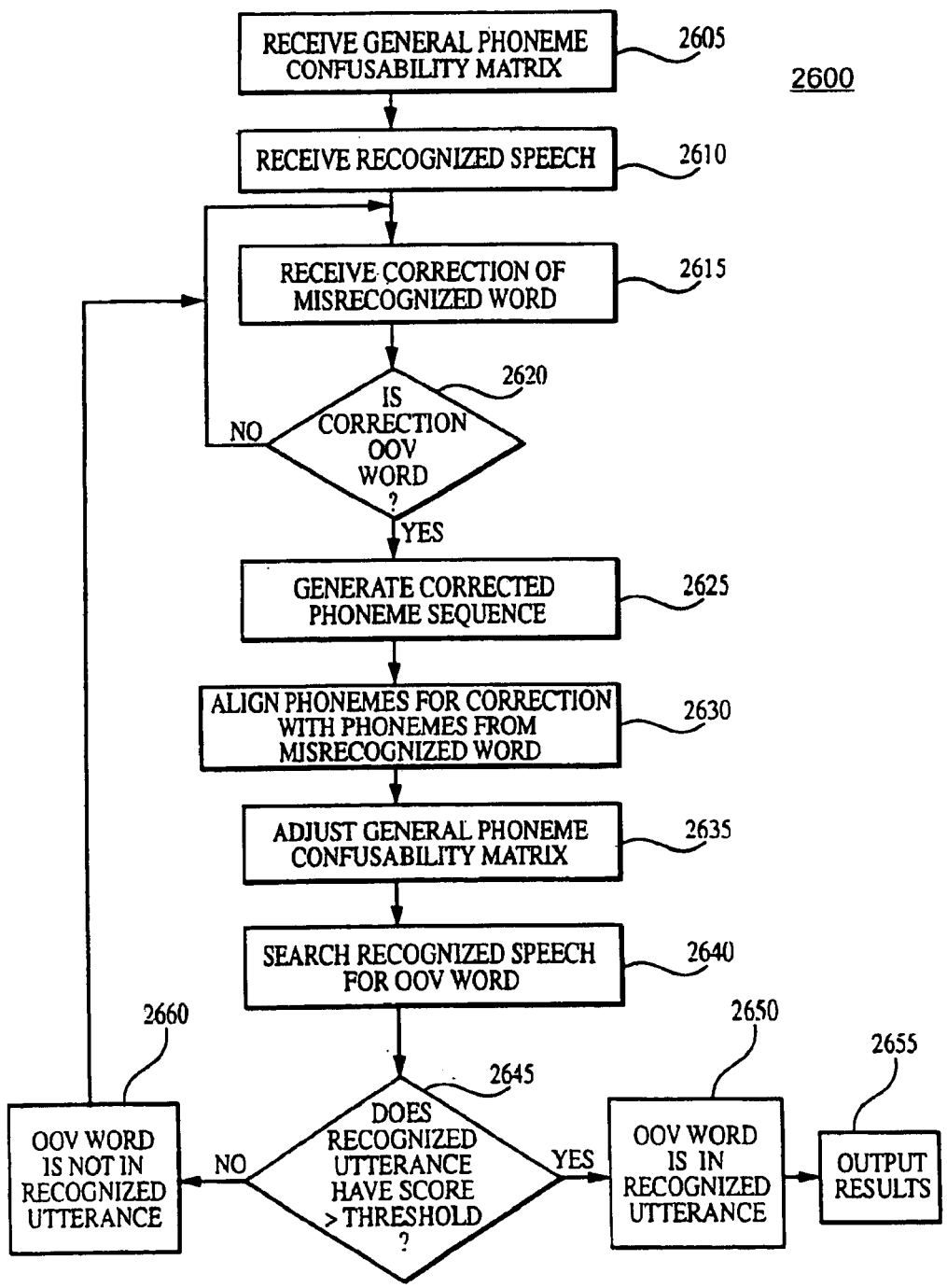
FIG. 20 is a flow chart of a procedure implemented by a speech recognition system such as the system shown in FIG. 5.

Referring also to FIG. 20, the speech recognition system may substantially reduce delays associated with correcting the OOV word by implementing an OOV global correction according to a procedure 2600. Initially, the speech recognition system receives a general phoneme confusability matrix (step 2605) and the text document representing recognized speech (step 2610). The text document includes associated lists of recognition candidates for each recognized utterance. The lists are created by the system during recognition.

The general phoneme confusability matrix is built before the procedure of FIG. 20 is implemented using the premise that any phoneme may be confused for another phoneme. The probability of confusion depends on the characteristics of the two phonemes and the characteristics of the speaker's pronunciation. For example, the phoneme for "m" is commonly mistaken for the phoneme for "n", and the phoneme for "t" is commonly mistaken for the phoneme for "d".

FIG. 21 shows a general phoneme confusability matrix 2700 for a subset of the phonemes in a one type of phonetic alphabet. Using the phonetic alphabet, for example, the phrase "the term of this agreement shall begin on the 31st day of January ,\comma 1994 ,\comma" may translate into phonemes:
"D/tVm@vDis@grEm~tS@1b/ginonD/TVt/ fVstA@vjanyUer/kom@nIntEnnIn/f{rkom@".

In the general phoneme confusability matrix 2700, scores for confused pronunciation matches are represented as negative logarithms of a rate or likelihood that a spoken phoneme corresponding to the row is recognized as the phoneme corresponding to the column. Therefore, a higher number indicates a lower probability of confusion and a lower number indicates a higher probability of confusion. The phoneme confusability matrix may be adapted continually for a particular user's speech patterns.

For example, the phoneme "z" is recognized as the phoneme "s" at a rate of $e^{-15}$ or about $3 \times 10^{-7}$, whereas the phoneme "i" is recognized as the phoneme "6" at a rate of $e^{-10}$ or about $5 \times 10^{-5}$. As another example, the phoneme "q" is confused with (or recognized correctly as) the phoneme "q" at a rate of $e^{-1}$ or about 0.4. This occurs because the speech recognition system is often unable to identify the phoneme "q" in speech.

The phoneme "<b>" listed in the matrix 2700 corresponds to a blank. Therefore, the entry for—w, <b>—represents the probability that the phoneme "w" is deleted, whereas the entry for—<b>, w—represents the probability that the phoneme "w" is inserted. Thus, for example, the phoneme "t" is deleted at a rate of $e^{-7}$ or $9 \times 10^{-4}$ and the phoneme "e" in inserted at a rate of $e^{-19}$ or $6 \times 10^{-9}$.

A determination of which phonemes may be confused with each other and the probability of that confusion may be based on empirical data. Such empirical data may be produced, for example, by gathering a speech recognition system's rate of confusion of phonemes for a preselected population or by studying frequency characteristics of different phonemes. A speech recognition system also may gather this data for pronunciations by a single user as part of the system's continuous training.

Scores for confused pronunciation matches in the general phoneme confusability matrix may be generated using three sources of information: the probability that a sequence of phonemes for which the matches were sought (a recognized sequence) was the actual sequence of phonemes produced by the speaker, the probability that a particular confused pronunciation (the confused sequence) was confused for the recognized sequence, and the probability that the confused sequence occurs in the language (for example, English) with which the speech recognition system is used. These probabilities correspond to the scores produced by, respectively, the recognizer for the recognized sequence, a dynamic programming match of the recognized phonemes with the dictionary pronunciation using a priori probabilities of phoneme confusion, and an examination of a unigram language model for the words corresponding to the pronunciation of the recognized sequence.

Referring again to FIG. 20, the user is able to view the text document using a word processing program, or another program that displays the text document. The user corrects mistakes found in the text document by, for example, typing or dictating the correct spelling of a word. In this way, the user provides the speech recognition system with corrected text for a misrecognized word (step 2615). The speech recognition system searches the vocabulary for the corrected text (step 2620). If the corrected text is in the vocabulary, the speech recognition system awaits another correction from the user (step 2615).

If the corrected text is not in the vocabulary, the corrected text is an OOV word. In this case, the speech recognition system generates a sequence of phonemes for the corrected text (step 2625). In generating the sequence of phonemes for the corrected text, the speech recognition system uses a phonetic alphabet.

The speech recognition system aligns the phonemes for the corrected text with the phonemes in each of the misrecognized words in the choice list for the utterance that includes the corrected text (step 2630) and then adjusts a copy of a general phoneme confusability matrix based on the alignment (step 2635). The speech recognition system searches the recognized speech for the OOV word using the adjusted phoneme confusability matrix (step 2640).

In general, after completing procedure 2600, the speech recognition system adds an OOV word to its vocabulary to improve future recognition accuracy. When the OOV word is added to the vocabulary, the speech recognition system need not save the adjusted phoneme confusability matrix. However, if the OOV word is not added, the adjusted phoneme confusability matrix for the OOV word may be saved and accessed in the future by the speech recognition system when encountering the OOV word in a user's utterance.

During alignment (step 2630), the speech recognition system compares a sequence of phonemes corresponding to the misrecognized portion of the utterance including the OOV word with the sequence of phonemes for the OOV word. The speech recognition system also generates a list of phoneme confusions that are likely to be associated with the OOV word. The speech recognition system generates this list by determining which phonemes in the corrected sequence are deleted, inserted, or substituted to map from the sequence of phonemes for the OOV word to the misrecognized sequence.

Initially, during the recognition, the speech recognition system attempts to recognize an OOV word or phrase using combinations of words, letters, and phrases in its vocabulary that most closely resemble the OOV word. Such combinations may match the OOV word closely but not necessarily exactly. For example, if the phrase "recognize" is misrecognized because "recognize" is not in the vocabulary, the speech recognition system may substitute the words "wreck a nice" for "recognize" during the recognition. To do this, the speech recognition system substitutes an "s" sound for the "z" sound at the end of the word and completely drops the "g" sound from the word.

Figure 22:
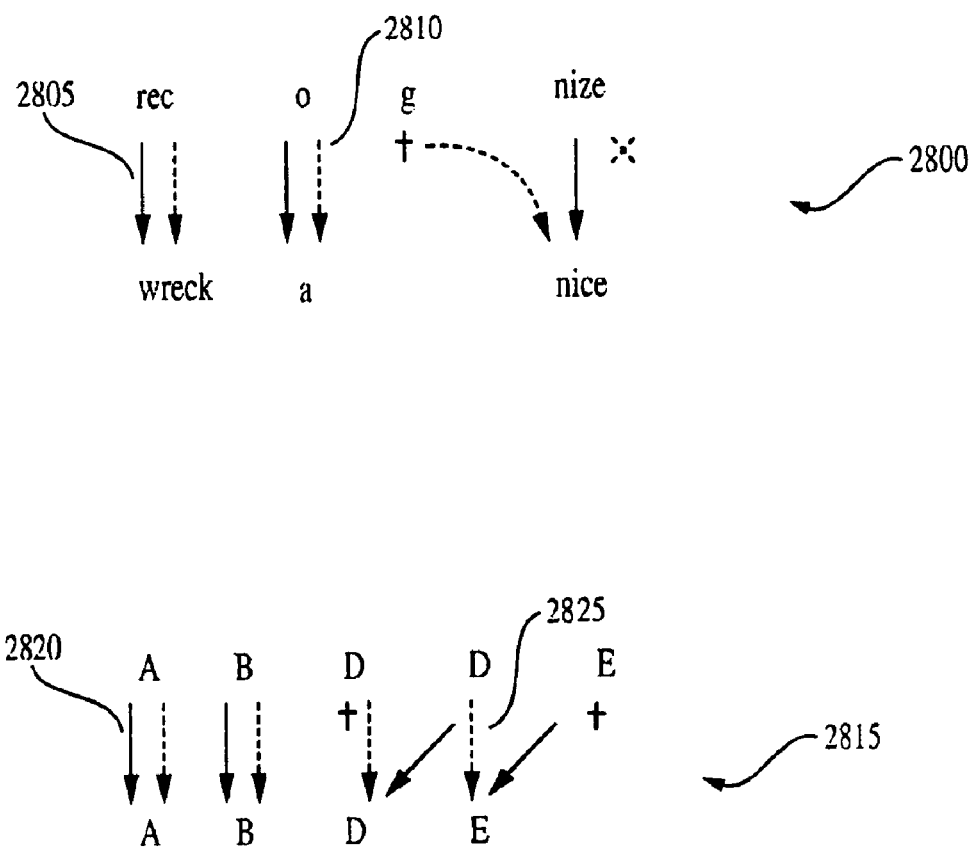
FIG. 22 is a diagram showing correction of a word using the procedure of FIG. 20.

Referring also to FIG. 22, for example, the user has corrected the misrecognized phrase "wreck a nice" with the corrected text "recognize" in a first example 2800. FIG. 22 illustrates two possible alignments from the substantially larger set of all possible alignments. In general, the alignments illustrated are more likely to score well than alignments that are not shown. The first alignment 2805 is shown using the solid arrows from the phonemes of "recognize" to the phonemes of "wreck a nice". In this alignment, the "g" is deleted and "nize" is substituted with "nice". The second alignment 2810 is shown using the dotted arrows from the phonemes of "recognize" to the phonemes of "wreck a nice". In this alignment, the "g" is replaced with "nice" and "nize" is deleted. Scores for each of the alignments are determined using the general phoneme confusability matrix. For example, if the likelihood of deleting "g" and substituting "nize" with "nice" is greater than the likelihood of substituting "g" with "nice" and deleting "nize", then the speech recognition system outputs a better score for the first alignment 2805 in FIG. 22.

In a more general example 2815, the proofreader has corrected the misrecognized sequence of phonemes "ABDE" with the sequence of phonemes "ABCDE". In this case, the speech recognition system determines a first alignment 2820 (shown as solid arrows) as: replace "A" with "A", replace "B" with "B", delete "C", replace "D" with "D", and replace "E" with "E". The speech recognition system determines a second alignment 2825 (shown as dotted arrows) as: replace "A" with "A", replace "B" with "B", replace "C" with "D", replace "D" with "E", and delete "E". Scores for each of the alignments are determined using the general phoneme confusability matrix. For example, if the likelihood of deleting "C", substituting "D" with "D", and substituting "E" with "E" is greater than the likelihood of substituting "C" with "D", substituting "D" with "E", and deleting "E", then the speech recognition system produces a better score for the first alignment 2820 in FIG. 22.

Referring again to FIG. 20, the speech recognition system adjusts the copy of the general phoneme confusability matrix based on one or more best scoring alignments (step 2635). The speech recognition system makes this adjustment based on the information about deletion, insertion, or substitution obtained from the alignment. For example, the speech recognition system may adjust the rate or score in the general phoneme confusability matrix 2700 to reflect a change in the rate of substitution of the phoneme "s" for the phoneme "z." Thus, the entry for confusing "z" with "s" has a value of 15 in the general phoneme confusability matrix 2700. After adjustment, the entry for confusing "z" with "s" may have a value of 1 in an adjusted phoneme confusability matrix, which indicates that "z" is confused with "s" 36% of the time for this particular OOV word. Although the value may be adjusted to 1 in this example, the value also may be set empirically. For example, the entry may be changed to 0 for those phonemes that are more confusable. Each time that a particular phoneme confusion is seen in the entries, that number may be used when considering how to adjust the matrix for that pair of phonemes.

After the speech recognition system has adjusted the general phoneme confusability matrix (step 2635), the speech recognition system searches for the OOV word in the text document using the adjusted matrix (step 2640). In general, the search procedure (step 2640) involves searching for the phoneme string associated with the OOV word, or likely confused variations of the phoneme string, in each utterance in the text document. Such a search makes use of the same alignment and scoring procedures as described above, but now compares the phoneme string for the OOV word to candidate substrings of each recognized utterance, systematically progressing through the recognized text. If an utterance receives a score above an empirically-determined threshold (step 2645), the speech recognition system assumes that the utterance includes the OOV word (step 2650) and outputs results (step 2655). Results may be output by, for example, highlighting the recognized utterances in the text document that are likely to include the misrecognized word. In this way, the proofreader or user may review the highlighted utterances to determine if further action is needed. Thus, the speech recognition system may present the utterances to the proofreader or user in a fashion similar to the highlighting of misspelled words from a spell checker. Alternatively or in addition, results may be output by, for example, automatically re-recognizing those utterances that receive a score above the threshold, now using a vocabulary extended to include the OOV word.

If an utterance receives a score below or equal to the threshold (step 2645), the speech recognition system assumes that the utterance does not include the OOV word (step 2660).

Using the procedure 2600, one implementation of the speech recognition system is able to identify approximately 95% of the utterances that include occurrences of the misrecognized word. Moreover, the same implementation is able to reject around 95% of the utterances that do not include the misrecognized word. This has resulted in a dramatic improvement in the proofreading process with respect to correcting OOV words.

While being applicable primarily to the correction of OOV word misrecognitions, the techniques described above also may be applied to detect and correct other recognition errors that are repeated throughout a document. For example, if non-traditional pronunciation by the user results in the system misrecognizing one vocabulary word for one or more other vocabulary words, the techniques may be used to detect and highlight (or even correct) other potential occurrences of the same misrecognition. It is also important to note that the system does not need to have produced the same incorrect result for each occurrence of a word in order for those occurrences to be detected. For example, a single instantiation of the procedure 2600 would detect the misrecognition of "recognize" as both "wreck a nice" and "wreck at night." When procedure 2600 is used to correct misrecognitions of vocabulary words, the speech recognition system would adapt the speech models for the user to prevent such misrecognitions from occurring in future recognitions.

The techniques described above also may be applied to perform efficient text searching through a large body of speech that has been recognized, a technique referred to as audio mining. For example, when searching audio recordings for a unique name (such as the name "Fooberman"), it would be beneficial to use the above described technique because the unique name may not be in an accessed vocabulary.

Conditional Adaptation

One problem with prior speech recognition systems is the necessity of obtaining user input to adapt or train the speech models. For example, traditional training techniques fall into one of two distinct categories: 1) solicitation of user participation in adapting speech models and 2) conservative adaptation of speech models. In the first technique, the speech recognition system asks or forces the user to correct any mistakes and trains the speech models using the corrected text. This technique, however, is often tedious to the user because the user must correct any mistakes. Moreover, this technique is impractical when using a recording device or any sort of mobile speech recognition system because user feedback in that type of system is reduced. In the second technique, the speech recognition system rarely adapts the speech models, which reduces the time that the user must spend correcting mistakes. However, this technique results in a reduced accuracy in the speech recognition results because the speech models are adapted infrequently. Both of these techniques fail to account for the case when a user is actually changing her mind about the wording and not correcting an error in the speech recognition system. When the user changes her mind, speech models should not be updated.

In a conditional adaptation strategy, the speech recognition system automatically determines whether a person is correcting a mistake or changing her mind during dictation. In one implementation, the user has dictated a body of text and a speech recognition system has recognized the body of text. When the user reads the recognized body of text, the user may select and edit some text to reflect 1) corrections to a misrecognition and/or 2) revisions to the text that reflect a change of mind for the user. During the user editing period, the speech recognition system uses information from the recording of the user's speech, the recognition results, and the user's edited text to determine whether the user is correcting or revising the text.

Figure 23:
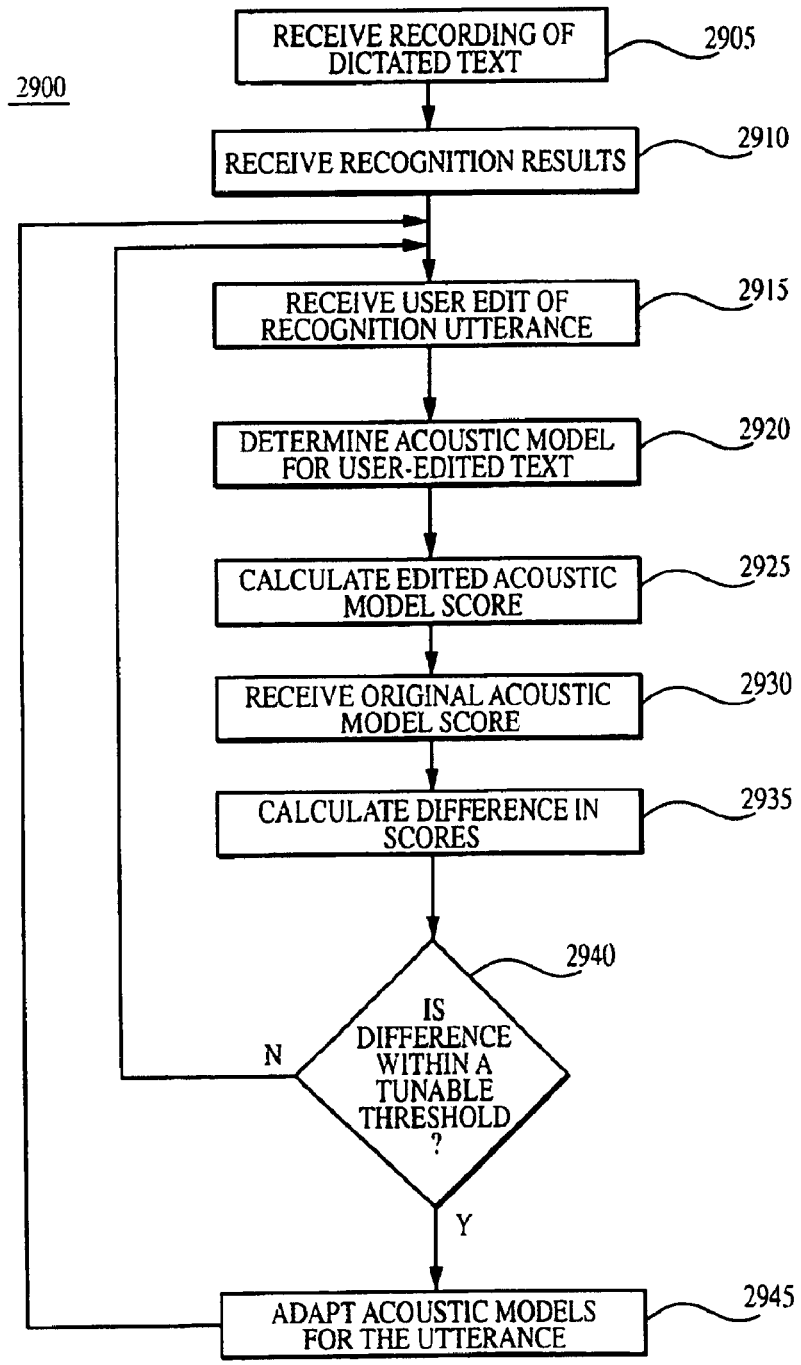
FIG. 23 is a flow chart of a procedure implemented by a speech recognition system such as the system shown in FIG. 5.

Referring also to FIG. 23, the speech recognition system performs a procedure 2900 for adapting acoustic models for a user's speech patterns. Initially, the speech recognition system receives the user-dictated text by, for example, receiving a recording from a recorder or receiving user-dictated text directly through a microphone (step 2905).

The speech recognition system then generates the recognized speech (step 2910). In one implementation, the speech recognition system recognizes the user's speech at the same time as adapting acoustic models for the user's speech patterns. In this case, the user may be editing the dictated text while speaking the dictated text. This may occur when the user is at a desktop computer dictating text and receiving immediate feedback from the speech recognition system.

In another implementation, the speech recognition system has already recognized the user-dictated text or speech and has stored it for later use in memory. In this case, the user may have already finished speaking the dictated text into the mobile recorder or directly into the microphone and the speech recognition system has stored the dictated text into memory.

Next, the speech recognition system receives one or more edits from the user while the user is reviewing the recognized text (step 2915). The user may edit the recognized text using any of the techniques described above. For example, the user may edit the recognized text in a correction dialog or by selecting the text and speaking the correction.

The speech recognition system then determines or builds an acoustic model for the user-edited text (step 2920). The speech recognition system may determine an acoustic model for the user-edited text by looking up the text in the vocabulary or in a backup dictionary. Alternatively, if the text is not in the vocabulary or the backup dictionary, the speech recognition system may select acoustic models for the user-edited text by finding acoustic models that best match the user-edited text.

As discussed above, an acoustic model may correspond to a word, a phrase or a command from a vocabulary. An acoustic model also may represent a sound, or phoneme, which corresponds to a portion of a word. Collectively, the constituent phonemes for a word represent the phonetic spelling of the word. Acoustic models also may represent silence and various types of environmental noise.

The speech recognition system calculates an edited acoustic model score based on a comparison between the acoustic model for the user-edited text and acoustic data for the original utterance that the user had spoken (this acoustic data for the original utterance is stored in the memory) (step 2925). The speech recognition system receives an original acoustic model score that was determined during recognition and is based on a comparison between the acoustic model for the recognized utterance and the acoustic data for the original utterance that the user had spoken (step 2930). The speech recognition system then calculates a difference between these scores (step 2935) and determines if this difference is within a tunable threshold (step 2940) to determine whether the user-edited text is a correction or a revision to the recognized utterance. If the difference is within a tunable threshold (step 2940), the speech recognition system adapts acoustic models for the correction of the recognized utterance (step 2945). On the other hand, if the difference is not within a tunable threshold (step 2940), the speech recognition system does not adapt the acoustic models for the revision to the recognized utterance.

For example, suppose that the user had originally spoken "the cat sat on the mat" and the speech recognition system recognized this utterance as "the hat sat on the mat". The acoustic data for the originally spoken "the cat sat on the mat" are stored in memory for future reference. The user reviews the recognized text and edits it, in one instance, for correction or for revision. If the user decides to correct the misrecognition, the user may select "hat" in the recognized text and spell out the word "cat". On the other hand, if the user decides to revise the recognition to read "the dog sat on the mat", then the user may select "hat" in the recognized text and speak the word "dog".

When considering the score difference, it is worthwhile to question how the edited acoustic model score for the user-edited text (called the new score) could be better than the original acoustic model score for the recognized utterance (called the old score). In this situation, it seems plausible that the speech recognition system should have detected a mistake in the recognized utterance. However, the speech recognition system may fail to detect a mistake. This could occur because the speech recognition system considers, in addition to the acoustic model, the language model. Another reason for the mistake or oversight could be that the speech recognition system may have produced a search error during recognition, that is, a correct hypothesis could have been pruned during recognition. One more reason that the speech recognition system may fail to detect a mistake may be that the recognized utterance included a new word that was pulled from the backup dictionary.

Another question that arises is how the new score could be a little worse than the old score. For example, when there is something wrong with the acoustic model for such a word, the speech recognition system should adapt the acoustics or guess a new pronunciation. However, in general, if the new score is much worse than the old score (relative to the tunable threshold), then the speech recognition system hypothesizes that the user-edited text corresponds to revisions.

Figure 24A:
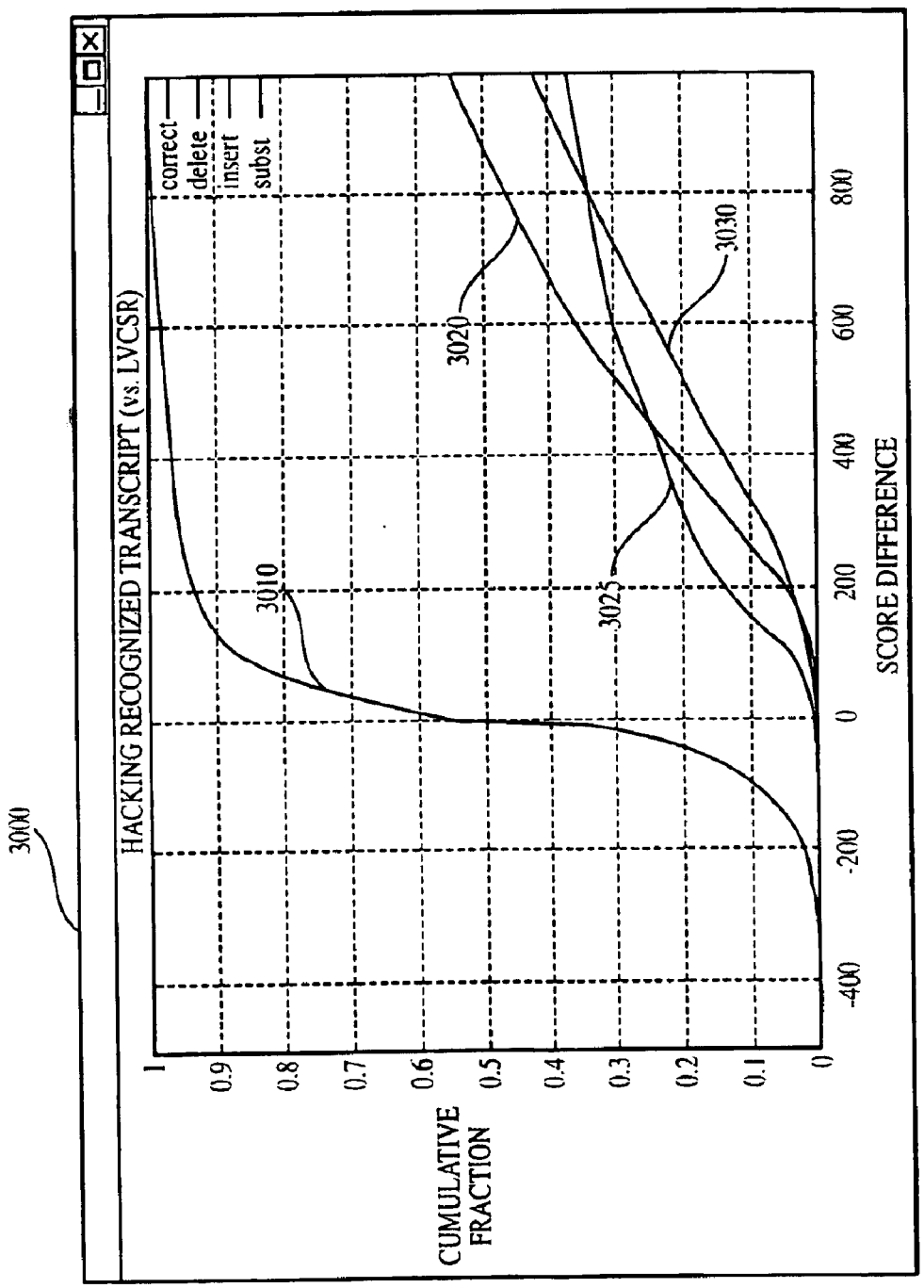
FIGS. 24A and 24B are graphs showing correction of errors using the procedure of FIG. 23 in comparison to random editing.
Figure 24B:
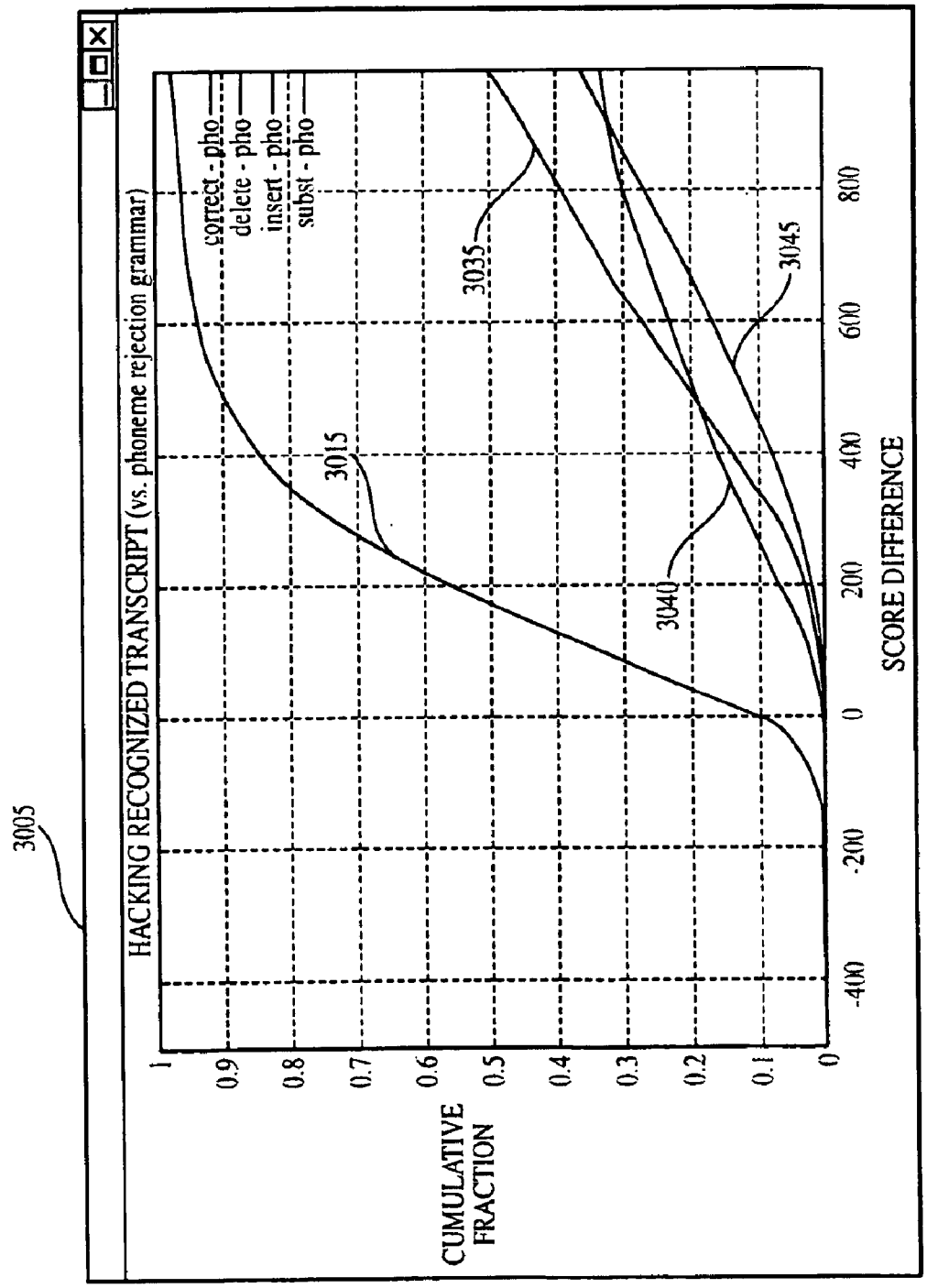

Referring also to FIGS. 24A and 24B, graphs 3000 and 3005 are shown that model the difference between the old score and the new score for each edited utterance in a sample block of recognition text. The recognition used a 50,000 word vocabulary. The tester has identified all regions of the recognition text that contain errors, and, for each of these regions, the tester has edited the recognized utterance. The graphs show the cumulative distribution of these regions, with the score difference between the new score and the old score being graphed in a histogram.

In graphs 3000 and 3005, the speech recognition system has performed word recognition on the original user utterance. In graph 3000, the speech recognition system uses a word vocabulary as a rejection grammar, and in graph 3005, the speech recognition system uses a phoneme sequence as a rejection grammar.

In graphs 3000 and 3005, the tester has corrected errors in the speech recognition and results are shown, respectively, in curves 3010 and 3015. For example, if the tester originally spoke the utterance "the cat sat on the mat" and the speech recognition system incorrectly recognized this utterance as "the hat sat on the mat", the tester may correct the recognition by selecting "hat" and spelling out "cat". In this case, the old score for the original utterance "cat" would match very nearly the new score for the recognized utterance "hat" and that is why the speech recognition system initially made the recognition error. Thus, the score difference determined at step 2925 would be relatively small.

Furthermore, the tester has modeled user revisions by making random edits to the text. Random edits include, in the simplest model, picking text at random from the recognition text and deleting that picked text, picking text at random from a choice list and inserting it somewhere in the recognition text, and picking text at random from the recognition text and substituting that picked text with random text from a choice list.

The random edits are also graphed in histogram form. For graph 3000, these curves are labeled as 3020 (deletion), 3025 (insertion), and 3030 (substitution) and for graph 3005, these curves are labeled as 3035 (deletion), 3040 (insertion), and 3045 (substitution). Other techniques for picking text at random are possible. For example, the tester may have picked only function words or only content words.

Using the example in which the user had originally spoken "the cat sat on the mat" and the speech recognition system recognized this as "the hat sat on the mat", the user may, during editing, replace the recognized word "hat" with the word "dog". In that case, the original acoustic model score (the old score) is fairly good, while the edited acoustic model score (the new score) is poor because the word "dog" sounds nothing like "cat", which is what the user originally spoke. Thus, the score difference would be rather large in this case (for example, 800 on the graph).

On the other hand, if the user replaced the recognized word "hat" with the word "rat", then the old score and the new score are both fairly good. Therefore, the score difference may be relatively small (for example, 150 on the graph).

Using the above example and graph 3000, if the threshold difference is 200 points, then the speech recognition system would adapt on the correction from "hat" to "cat", adapt on the revision from "hat" to "rat", and ignore the revision from "hat" to "dog". If the threshold difference is 100 points, the speech recognition system would adapt on the correction from "hat" to "cat", and ignore the revisions from "hat" to "rat" and from "hat" to "dog".

Evident from the randomly-generated curves 3020–3045 is that they are very similar to each other in shape and magnitude. Using a threshold of 200 difference points, about 5–15% of the randomly-generated revisions are used by the speech recognition system in adaptation and about 60–95% (where 60% corresponds to phoneme correction and 95% corresponds to word correction) of the corrected text is used by the speech recognition system in adaptation. If the threshold is reduced more, for example, to 50 difference points, then many more of the randomly-generated revisions may be eliminated from adaptation. However, there will be fewer corrections with which to adapt the speech models.

The techniques and systems described above benefit from the knowledge that the original recognition results are a fairly good acoustic fit to the user's speech. Moreover, when language model scores are included, the original recognition results are considered a very good fit to the user's speech. Additionally, when finding the difference in acoustic scores, the scores cancel for those utterances that are unchanged in the edited text and the scores for the corrected or revised utterances remain to be further analyzed by the speech recognition system. Thus, the techniques and systems may be applied to arbitrarily long utterances, without needing to normalize for the length of the utterance.

Distinguishing Spelling and Dictation During Correction

Figure 25:
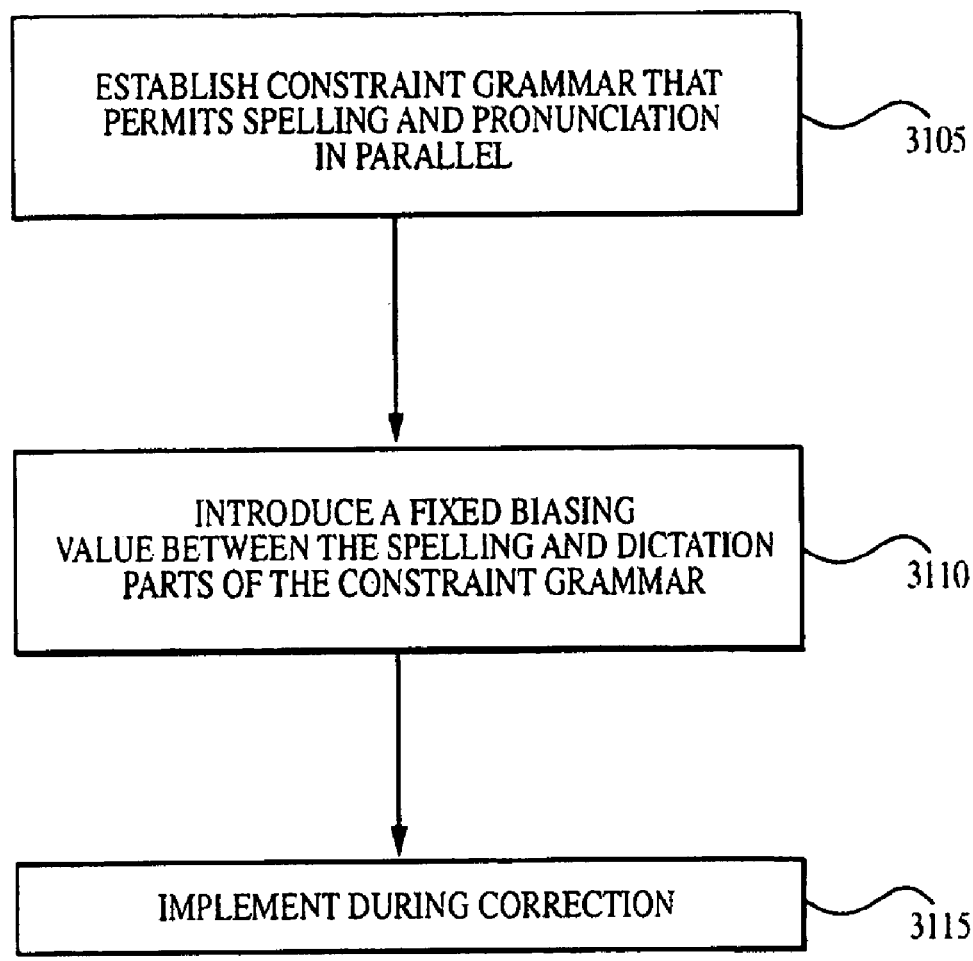
FIG. 25 is a flow chart of a procedure implemented by a speech recognition system such as the system shown in FIG. 5.

Referring to FIG. 25, a speech recognition system may be configured to distinguish between correction in the form of spelling correction and in the form of dictation according to a procedure 3100. When a user selects misrecognized text, the user can either speak the pronunciation of the correct word or the user can spell the correct word. The speech recognition system distinguishes between these two correction mechanisms without requiring the user to indicate which correction mechanism is being used. For example, the user need not speak the command "SPELL THAT" before spelling out the corrected text. As another example, the user need not speak the command "MAKE THAT" before pronouncing the corrected text.

Figure 26:
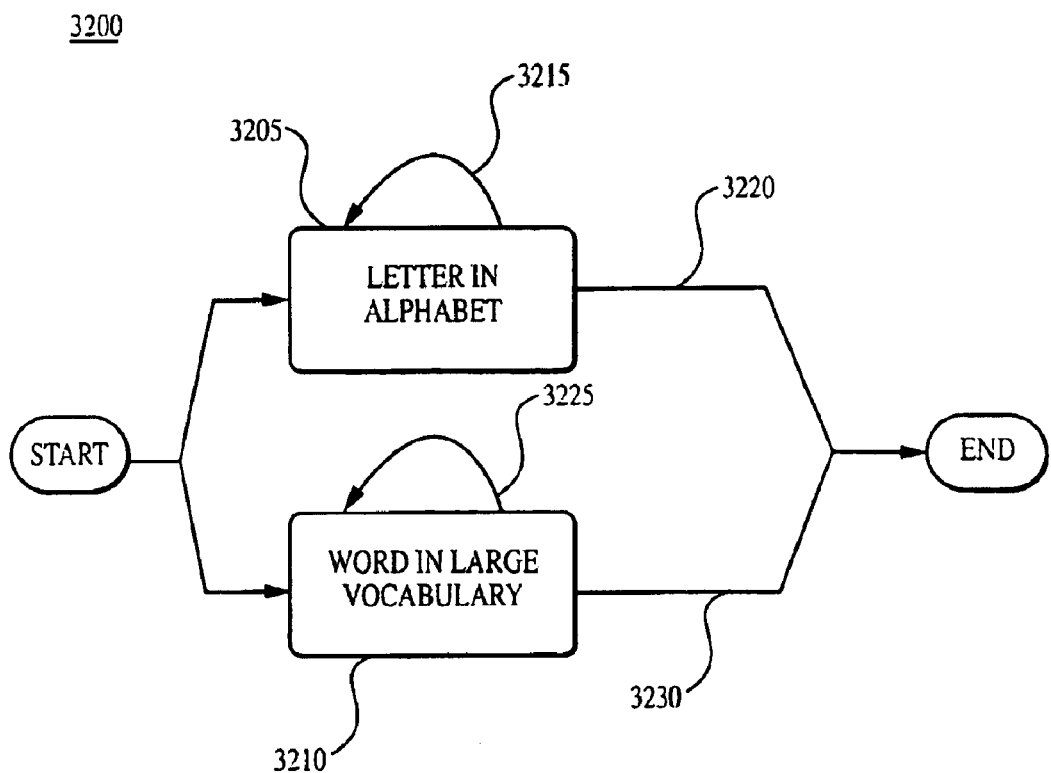
FIG. 26 shows a constraint grammar used in the procedure of FIG. 25.

Referring also to FIG. 26, a constraint grammar 3200 that permits spelling and pronunciation in parallel is established (step 3105). The constraint grammar 3200 includes a spelling portion in which a first state 3205 indicates that the first utterance from the user must be a letter in an alphabet and a large vocabulary dictation portion in which a first state 3210 indicates that the first utterance from the user must be a word from the dictation vocabulary. A path 3215, which returns to the first state 3205, indicates that the utterance may include additional letters. A path 3220, which exits the first state 3205 and completes the utterance, indicates that the utterance may include only letters. A path 3225, which returns to the second state 3210, indicates that the utterance may include additional words from the dictation vocabulary. A path 3230, which exits the second state 3210 and completes the utterance, indicates that the utterance may include only words from the dictation vocabulary.

The large vocabulary dictation portion also indicates the frequency with which words occur. For example, a language model associated with the large vocabulary dictation portion may be a unigram model that indicates the frequency with which a word occurs independently of context or a bigram model that indicates the frequency with which a word occurs in the context of a preceding word. For example, a bigram model may indicate that a noun or adjective is more likely to follow the word "the" than a verb or preposition.

Similarly, the spelling portion may indicate the frequency with which letters occur. For example, a language model associated with the spelling portion may be a unigram model that indicates the frequency with which a letter occurs independently of context or a bigram model that indicates the frequency with which a letter occurs in the context of a preceding letter. For example, a bigram model may indicate that a vowel is more likely to follow the letter "m" than a consonant.

Referring again to FIG. 25, a fixed biasing value between the spelling and dictation grammars may be introduced to improve the chances that the speech recognition system distinguishes a spelled correction from a pronounced correction (step 3110).

After the constraint grammar is established (step 3105), the constraint grammar may be implemented during error correction (step 3115). In this manner, during correction, the speech recognition system initially determines if the user is correcting an error. If so, the system recognizes the user's correction using the established constraint grammar. If the user corrects the misrecognition by spelling out the correct word, the speech recognition system determines that the correction follows the path through the state 3205 and determines the correction accordingly. If the user corrects the misrecognition by pronouncing the correct word, the speech recognition system determines that the correction follows the path through the state 3210 and determines the correction accordingly.

Because both of the constraint grammar portions are used in parallel by the speech recognition system, the system is able to determine which portion gives the most likely recognition result.

If a fixed biasing value is introduced between the spelling portion and the dictation portion, then the speech recognition system considers the biasing when selecting between the portions. For example, the biasing value may indicate that the user is more likely to dictate a correction than to spell it, such that the score for spelling portions will need to be better than that of the dictation portion by more than the biasing value in order to be selected.

The techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and nonvolatile memory and/or storage elements), at least one input device, and at least one output device. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (for example, CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of correcting incorrect text associated with recognition errors in computer-implemented speech recognition, the method comprising:
    performing speech recognition on an utterance to produce a recognition result for the utterance;
    receiving from a user a selection of a word from the recognized utterance, the selection indicating a bound of a portion of the recognized utterance to be corrected;

comparing a first alternative transcript to the recognized utterance to be corrected;

producing a first recognition correction based on the comparison;

comparing a second alternative transcript to the recognized utterance to be corrected;

producing a second recognition correction based on the second comparison; and replacing a portion of the recognition result with one of the first recognition correction and the second recognition correction;

wherein a duration of the first recognition correction differs from a duration of the second recognition correction, and the portion of the recognition result replaced includes at one bound a word indicated by the selection and extends for the duration of the one of the first recognition correction and the second recognition correction with which the portion is replaced and includes at least one word other than the user-selected word.

2. The method of claim 1 wherein the selection indicates a beginning bound of a recognized utterance to be corrected.

3. The method of claim 1 wherein the selection indicates a finishing bound of a recognized utterance to be corrected.

4. A method of correcting incorrect text associated with recognition errors in computer-implemented speech recognition, the method comprising:

performing speech recognition on an utterance to produce a recognition result for the utterance;

receiving a selection of a word from the recognized utterance, the selection indicating a bound of a portion of the recognized utterance to be corrected;

comparing a first alternative transcript to the recognized utterance to be corrected;

producing a first recognition correction based on the comparison;

comparing a second alternative transcript to the recognized utterance to be corrected;

producing a second recognition correction based on the second comparison; and replacing a portion of the recognition result with one of the first recognition correction and the second recognition correction;

wherein a duration of the first recognition correction differs from a duration of the second recognition correction, and the portion of the recognition result replaced includes at one bound a word indicated by the selection and extends for the duration of the one of the first recognition correction and the second recognition correction with which the portion is replaced, and wherein comparing an alternative transcript to the recognized utterance comprises:

selecting from the alternative transcript a test word that is not identical to the selected word and that begins at a time that is nearest a time at which the selected word begins; and searching in time, through the recognized utterance relative to the selected word, and through the alternative transcript relative to the test word, until finding a word common to the recognized utterance and the alternative transcript.

5. The method of claim 4 wherein the common word begins at a time in the recognized utterance that is substantially equal to a time at which the common word begins in the alternative transcript.

6. The method of claim 5 wherein producing a recognition correction comprises selecting a word string from the alternative transcript, the word string bound by the test word from the alternative transcript and by a word from the alternative transcript that is adjacent to the common word and between the test word and the common word.

7. The method of claim 6 further comprising receiving a selection of one of the first recognition correction and the second recognition correction.

8. The method of claim 6 wherein searching in time through the recognized utterance and through the alternative transcript comprises:

designating a word adjacent to the test word as an alternative transcript word;

designating a word adjacent to the selected word as an original transcript word; and comparing the original transcript word to the alternative transcript word.

9. The method of claim 8 wherein searching in time through the recognized utterance and through the alternative transcript comprises:

designating the original transcript word and the alternative transcript word as the common word if:

the original transcript word is identical to the alternative transcript word, and a time at which the original transcript word begins is near a time at which the alternative transcript word begins.

10. The method of claim 9 wherein searching in time through the recognized utterance and through the alternative transcript comprises:

designating a word adjacent to the alternative transcript word in the alternative transcript as the alternative transcript word if:

the original transcript word is not identical to the alternative transcript word, and a time at which the original transcript word begins is later than a time at which the alternative transcript word begins.

11. The method of claim 9 wherein searching in time through the recognized utterance and through the alternative transcript comprises:

designating a word adjacent to the alternative transcript word in the alternative transcript as the alternative transcript word if:

the original transcript word is identical to the alternative transcript word, and a time at which the original transcript word begins is later than a time at which the alternative transcript word begins.

12. The method of claim 9 wherein searching in time through the recognized utterance and through the alternative transcript comprises:

designating a word adjacent to the original transcript word in the original transcript as the original transcript word if:

the original transcript word is not identical to the alternative transcript word, and a time at which the original transcript word begins is earlier than a time at which the alternative transcript word begins.

13. The method of claim 9 wherein searching in time through the recognized utterance and through the alternative transcript comprises:

designating a word adjacent to the original transcript word in the original transcript as the original transcript word if:

the original transcript word is identical to the alternative transcript word, and a time at which the original transcript word begins is earlier than a time at which the alternative transcript word begins.

14. The method of claim 9 wherein searching in time through the recognized utterance and through the alternative transcript comprises:

designating a word adjacent to the original transcript word in the original transcript as the original transcript word and a word adjacent to the alternative transcript word in the alternative transcript as the alternative transcript word if:

the original transcript word is not identical to the alternative transcript word, and a time at which the original transcript word begin is near a time at which the alternative transcript word begins.

15. A method of correcting incorrect text associated with recognition errors in computer-implemented speech recognition, the method comprising:

performing speech recognition on an utterance to produce a recognition result for the utterance;

receiving a selection of a word from the recognized utterance, the selection indicating a bound of a portion of the recognized utterance to be corrected;

comparing an alternative transcript to the recognized utterance to be corrected, the comparing comprising:

selecting from the alternative transcript a test word that begins at a time that is nearest a time at which the selected word begins; and searching in time, relative to the selected word, through the recognized utterance, and searching in time, relative to the test word, through the alternative transcript until finding a word common to the recognized utterance and the alternative transcript;

producing a recognition correction based on the comparison; and replacing a portion of the recognition result with the recognition correction.

16. A method of correcting incorrect text associated with recognition errors in computer-implemented speech recognition, the method comprising:

performing speech recognition on an utterance to produce a recognition result for the utterance;

receiving a selection of a word from the recognized utterance, the selection indicating a bound of a portion of the recognized utterance to be corrected; and comparing an alternative transcript to the recognized utterance to be corrected, the comparing including:

selecting from the alternative transcript a test word that is not identical to the selected word and that occurs at a time that is nearest a time at which the selected word occurs, and searching in time, through the recognized utterance relative to the selected word, and through the alternative transcript relative to the test word, until finding a word common to the recognized utterance and the alternative transcript.

17. The method of claim 16, further comprising:

producing a recognition correction based on the comparison;

replacing a portion of the recognition result with the recognition correction;

wherein the portion of the recognition result replaced includes at one bound a word indicated by the selection and extends for the duration of the recognition correction with which the portion is replaced.

18. A method of correcting incorrect text associated with recognition errors in computer-implemented speech recognition, the method comprising:

receiving a text document formed by recognizing speech utterances using a vocabulary;

receiving a general confusability matrix having one or more values each indicating a likelihood of confusion between a first phoneme and a second phoneme;

receiving corrected text that corresponds to misrecognized text from the text document;

generating a sequence of phonemes for the corrected text;

aligning the generated sequence of phonemes with phonemes of the misrecognized text;

adjusting one or more values of the general confusability matrix based on the alignment to form a specific confusability matrix; and searching the text document for additional instances of the corrected text using the specific confusability matrix.

19. The method of claim 18 in which generating the sequence of phonemes for the corrected text includes determining whether the corrected text is in the vocabulary.

20. The method of claim 18 further comprising outputting the text document.

21. The method of claim 18 in which a list of recognition candidates is associated with each recognized speech utterance.

22. The method of claim 21 in which the empirical data comprises information relating to frequency characteristics of different phonemes.

23. The method of claim 21 in which the empirical data comprises information acquired during an adaptive training of a user.

24. The method of claim 18 in which generating the sequence of phonemes for the corrected text comprises using a phonetic alphabet.

25. The method of claim 18 further comprising generating the general confusability matrix using empirical data.

26. The method of claim 25 in which the empirical data comprises information relating to a rate of confusion of phonemes for a preselected population.

27. The method of claim 18 in which searching the text document for the corrected text comprises searching the text document for the sequence of phonemes for the corrected text.

28. The method of claim 18 in which searching the text document for the corrected text comprises searching the text document for a sequence of phonemes that is likely to be confused with the sequence of phonemes for the corrected text.

29. The method of claim 18 in which searching the text document for the corrected text comprises scoring a portion of the text document and comparing the score of the portion to an empirically determined threshold value to determine whether the portion of the text document includes a word that is not in the vocabulary.

30. The method of claim 29 further comprising outputting a result if it is determined that the portion of the text document includes a word that is not in the vocabulary.

31. The method of claim 30 in which outputting the result comprises highlighting the portion of the text document.

32. The method of claim 30 in which outputting the result comprises re-recognizing the portion of the text document.

* * * * *